(12) United States Patent
Fakoorian et al.

(10) Patent No.: US 11,553,482 B2
(45) Date of Patent: Jan. 10, 2023

(54) TECHNIQUES FOR DETERMINING RESOURCES FOR REPETITIONS IN WIRELESS COMMUNICATIONS

(71) Applicant: QUALCOMM Incorporated, San Diego, CA (US)

(72) Inventors: Seyed Ali Akbar Fakoorian, San Diego, CA (US); Jing Sun, San Diego, CA (US); Seyedkianoush Hosseini, San Diego, CA (US); Wei Yang, San Diego, CA (US); Peter Gaal, San Diego, CA (US); Wanshi Chen, San Diego, CA (US)

(73) Assignee: QUALCOMM Incorporated., San Diego, CA (US)

( * ) Notice: Subject to any disclaimer, the term of this patent is extended or adjusted under 35 U.S.C. 154(b) by 0 days.

(21) Appl. No.: 16/915,470

(22) Filed: Jun. 29, 2020

(65) Prior Publication Data
US 2021/0014858 A1 Jan. 14, 2021

Related U.S. Application Data

(60) Provisional application No. 62/888,057, filed on Aug. 16, 2019, provisional application No. 62/871,416, filed on Jul. 8, 2019.

(51) Int. Cl.
*H04W 72/04* (2009.01)
*H04W 72/14* (2009.01)
*H04L 5/00* (2006.01)

(52) U.S. Cl.
CPC ....... *H04W 72/0446* (2013.01); *H04L 5/0044* (2013.01); *H04L 5/0053* (2013.01);
(Continued)

(58) Field of Classification Search
None
See application file for complete search history.

(56) References Cited

U.S. PATENT DOCUMENTS

| 2014/0029486 A1* | 1/2014 | Li | H04W 72/042 |
| | | | 370/280 |
| 2017/0048880 A1* | 2/2017 | Anderson | H04W 72/1268 |

(Continued)

OTHER PUBLICATIONS

U.S. Appl. No. 62/823,491, filed Mar. 25, 2019 (Year: 2019).*
(Continued)

*Primary Examiner* — Faruk Hamza
*Assistant Examiner* — Cassandra L Decker
(74) *Attorney, Agent, or Firm* — Arent Fox, LLP

(57) ABSTRACT

Aspects described herein relate to determining symbols over which to transmit repetitions for certain types of communications. A resource grant can include information for transmitting a number of repetitions over a collection of resources, such as a starting symbol over which to transmit communications, a number of symbols over which to transmit communications, and/or a nominal number of repetitions to transmit. Where time division multiplexing (TDM) communications are configured, a slot format indicator (SFI) can be semi-statically or dynamically configured and can indicate a communication direction of symbols within one or more slots as being uplink, downlink, or flexible. Thus, mapping uplink communications to the symbols may be based on additional considerations.

30 Claims, 16 Drawing Sheets

(52) U.S. Cl.
CPC .......... *H04L 5/0092* (2013.01); *H04L 5/0094* (2013.01); *H04W 72/042* (2013.01); *H04W 72/14* (2013.01)

(56) References Cited

U.S. PATENT DOCUMENTS

| | | | |
|---|---|---|---|
| 2017/0135078 A1* | 5/2017 | Lim | H04L 5/0044 |
| 2017/0332396 A1* | 11/2017 | Liao | H04W 72/0446 |
| 2018/0309513 A1* | 10/2018 | Kim | H04L 5/0094 |
| 2018/0310333 A1* | 10/2018 | Akkarakaran | H04W 72/1278 |
| 2019/0150123 A1* | 5/2019 | Nogami | H04W 72/042 370/330 |
| 2019/0230689 A1* | 7/2019 | Cao | H04L 5/0007 |
| 2019/0245648 A1* | 8/2019 | Jo | H04L 5/00 |
| 2019/0312665 A1* | 10/2019 | Jo | H04L 5/0094 |
| 2019/0327755 A1* | 10/2019 | Xiong | H04L 5/0055 |
| 2019/0342944 A1* | 11/2019 | Chatterjee | H04W 76/27 |
| 2019/0349898 A1* | 11/2019 | Fu | H04W 72/042 |
| 2020/0052828 A1* | 2/2020 | Wang | H04W 72/0446 |
| 2020/0214006 A1* | 7/2020 | Choi | H04W 72/0413 |
| 2020/0221449 A1* | 7/2020 | Bang | H04W 72/0413 |
| 2020/0267764 A1* | 8/2020 | Rastegardoost | H04W 74/0833 |
| 2020/0305183 A1* | 9/2020 | Papasakellariou | H04L 1/1671 |
| 2020/0313793 A1* | 10/2020 | Jung | H04L 1/08 |
| 2020/0329483 A1* | 10/2020 | Tang | H04W 72/1268 |
| 2020/0336255 A1* | 10/2020 | Wong | H04L 1/1861 |
| 2021/0243758 A1* | 8/2021 | Ji | H04L 5/0044 |
| 2021/0297998 A1* | 9/2021 | Choi | H04L 5/00 |

OTHER PUBLICATIONS

CATT: "PUSCH Enhancements for URLLC", 3GPP Draft, 3GPP TSG RAN WG1 Meeting #97, R1-1906329, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 4, 2019 (May 4, 2019), XP051708364, 9 pages, Retrieved from the Internet: URL: http://www.3gpp.org/ftp/tsg%5Fran/WG1%5FRL1/TSGR1%5F97/Docs/R1%2D1906329%2Ezip. [retrieved on May 4, 2019] the whole document.

International Search Report and Written Opinion—PCT/US2020/040373—ISA/EPO—dated Oct. 6, 2020.

Nokia, et al., "Summary of Thursday offline Discussion on PUSCH Enhancements for NR eURLLC (AI 7.2.6.3)", 3GPP Draft, 3GPP TSG-RAN WG1 Meeting #96bis, R1-1905815—Summary of Thursday offline Discussion on 7.2.6.3 PUSCH Enhancements for NR eURLLC, 3rd Generation Partnership Project (3GPP), Mobile Competence Centre, 650, Route Des Lucioles, F-06921 Sophia-An, France, vol. RAN WG1, No. Xian, China, Apr. 8, 2019-Apr. 12, 2019, Apr. 15, 2019 (Apr. 15, 2019), XP051707862, 21 pages, Retrieved from the Internet: URL: http://www.3gpp.org/ftp/tsg%5Fran/WG1%5FRL1/TSGR1%5F96b/Docs/R1%2D1905815%2Ezip [retrieved on Apr. 15, 2019].

Qualcomm Incorporated: "PUSCH Enhancements for eURLLC", 3GPP TSG-RAN WG1 #97, R1-1907283, 3rd Generation Partnership Project (3GPP), Mobile Competence Centre, 650, Route Des Lucioles, F-06921 Sophia-Antipolis Cedex, France, vol. RAN WG1, No. May 13, 2019-May 17, 2019, Reno, Nevada, USA, pp. 1-7, May 17, 2019 (May 17, 2019), pp. 1-6, Retrieved from the Internet: URL: http://www.3gpp.org/ftp/Meetings%5F3GPP%5FSYNC/RAN1/Docs/R1%2D1907283%2Ezip. [retrieved on May 13, 2019] the whole document, p. 2 to p. 5.

ZTE: "Grant-based PUSCH Enhancements for URLLC", 3GPP Draft, 3GPP TSG RAN WG1 #96, R1-1901769, Grant-based PUSCH Enhancements for URLLC, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051599463, 8 pages, Retrieved from the Internet: URL: http://www.3gpp.org/ftp/tsg%5Fran/WG1%5FRL1/TSGR1%5F96/Docs/R1%2D1901769%2Ezip. [retrieved on Feb. 16, 2019] the whole document.

\* cited by examiner

TECHNIQUES FOR DETERMINING RESOURCES FOR REPETITIONS IN WIRELESS COMMUNICATIONS

CLAIM OF PRIORITY UNDER 35 U.S.C. § 119

The present Application for Patent claims priority to Provisional Patent Application No. 62/871,416, entitled "TECHNIQUES FOR DETERMINING RESOURCES FOR REPETITIONS IN WIRELESS COMMUNICATIONS" filed Jul. 8, 2019, and Provisional Patent Application No. 62/888,057, entitled "TECHNIQUES FOR DETERMINING RESOURCES FOR REPETITIONS IN WIRELESS COMMUNICATIONS" filed Aug. 16, 2019, which are assigned to the assignee hereof and hereby expressly incorporated by reference herein for all purposes.

BACKGROUND

Aspects of the present disclosure relate generally to wireless communication systems, and more particularly, to determining resources over which to transmit or receive repetitions.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband (eMBB) addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes determining a slot format indicator (SFI) indicating a communication direction for each of a plurality of symbols in a slot as being uplink, downlink, or flexible, receiving a resource grant for transmitting over an uplink shared channel, wherein the resource grant indicates an index of a starting symbol for transmitting an uplink communication, a number of symbols for transmitting the uplink communication, and a nominal number of repetitions for transmitting the uplink communication, determining that the resource grant includes an indicator indicating whether symbols in the slot indicated by the SFI as flexible can be used for uplink communications, and transmitting, based at least in part on the indicator, one or more repetitions of the uplink communication starting at the starting symbol, continuing over the number of symbols, and based on the nominal number of repetitions.

In another example, a method for wireless communication is provided that includes determining a SFI indicating a communication direction for each of a plurality of symbols in a slot as being uplink, downlink, or flexible, receiving a resource grant for transmitting over an uplink shared channel, wherein the resource grant indicates an index of a starting symbol for transmitting an uplink communication, a number of symbols for transmitting the uplink communication, and a nominal number of repetitions for transmitting the uplink communication, and transmitting, based on determining whether to monitor for dynamic SFI, one or more repetitions of the uplink communication starting at the starting symbol, continuing over the number of symbols, and based on the nominal number of repetitions.

In another example, a method for wireless communication is provided that includes receiving a SFI indicating a communication direction for each of a plurality of symbols in a slot as being uplink, downlink, or flexible, receiving a resource grant for transmitting over an uplink shared channel, wherein the resource grant indicates an index of a starting symbol for transmitting an uplink communication, a number of symbols for transmitting the uplink communication, and a nominal number of repetitions for transmitting the uplink communication, determining whether to transmit over one or more symbols indicated by the SFI as flexible or uplink based at least in part on a transition number of symbols defined for transitioning communication resources from receiving communications to transmitting communications, and transmitting, based at least in part on the determination of whether to transmit over the one or more symbols indicated by the SFI as flexible or uplink, one or more repetitions of the uplink communication starting at the starting symbol, continuing over the number of symbols, and based on the nominal number of repetitions.

In another example, a method for wireless communication is provided that includes transmitting a SFI indicating a communication direction for each of a plurality of symbols in a slot as being uplink, downlink, or flexible, transmitting a resource grant for an uplink shared channel, wherein the resource grant indicates an index of a starting symbol for transmitting an uplink communication, a number of symbols for transmitting the uplink communication, a nominal number of repetitions for transmitting the uplink communication, and an indicator indicating whether symbols in the slot indicated by the SFI as flexible can be used for uplink communications, and receiving, based at least in part on the indicator, one or more repetitions of the uplink communication starting at the starting symbol, continuing over the number of symbols, and based on the nominal number of repetitions.

In another example, a method for wireless communication is provided that includes transmitting a SFI indicating a communication direction for each of a plurality of symbols in a slot as being uplink, downlink, or flexible, transmitting a resource grant for an uplink shared channel, wherein the resource grant indicates an index of a starting symbol for transmitting an uplink communication, a number of symbols for transmitting the uplink communication, and a nominal number of repetitions for transmitting the uplink communication, determining, based at least in part on whether the resource grant is for ultra-reliable low-latency communication (URLLC) or enhanced mobile broadband (eMBB) communications, whether a communication direction of the number of symbols is based on a transmitted dynamic SFI, and receiving, based at least in part on determining whether the communication direction of the symbols is based on the transmitted dynamic SFI, one or more repetitions of the uplink communication starting at the starting symbol, continuing over the number of symbols, and based on the nominal number of repetitions.

In another example, a method for wireless communication is provided that includes transmitting, to a user equipment (UE), a SFI indicating a communication direction for each of a plurality of symbols in a slot as being uplink, downlink, or flexible, transmitting, to the UE, a resource grant for an uplink shared channel in symbols indicated by the SFI as flexible or uplink, and refraining from scheduling downlink communications for the UE over symbols indicated by the SFI as downlink that are within a transition number of symbols before a symbol indicated by the resource grant.

In another example, a method for wireless communication is provided that includes transmitting, to a UE, a SFI indicating a communication direction for each of a plurality of symbols in a slot as being uplink, downlink, or flexible, transmitting, to the UE, a configuration indicating to transmit uplink communications at least one of at least a transition number of symbols from one or more downlink symbols in the slot indicated by the SFI as downlink, or at least the transition number of symbols after a last downlink symbol in a set of one or more downlink symbols in the slot indicated by the SFI as downlink, and receiving, from the UE and based on the configuration, the uplink communications.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
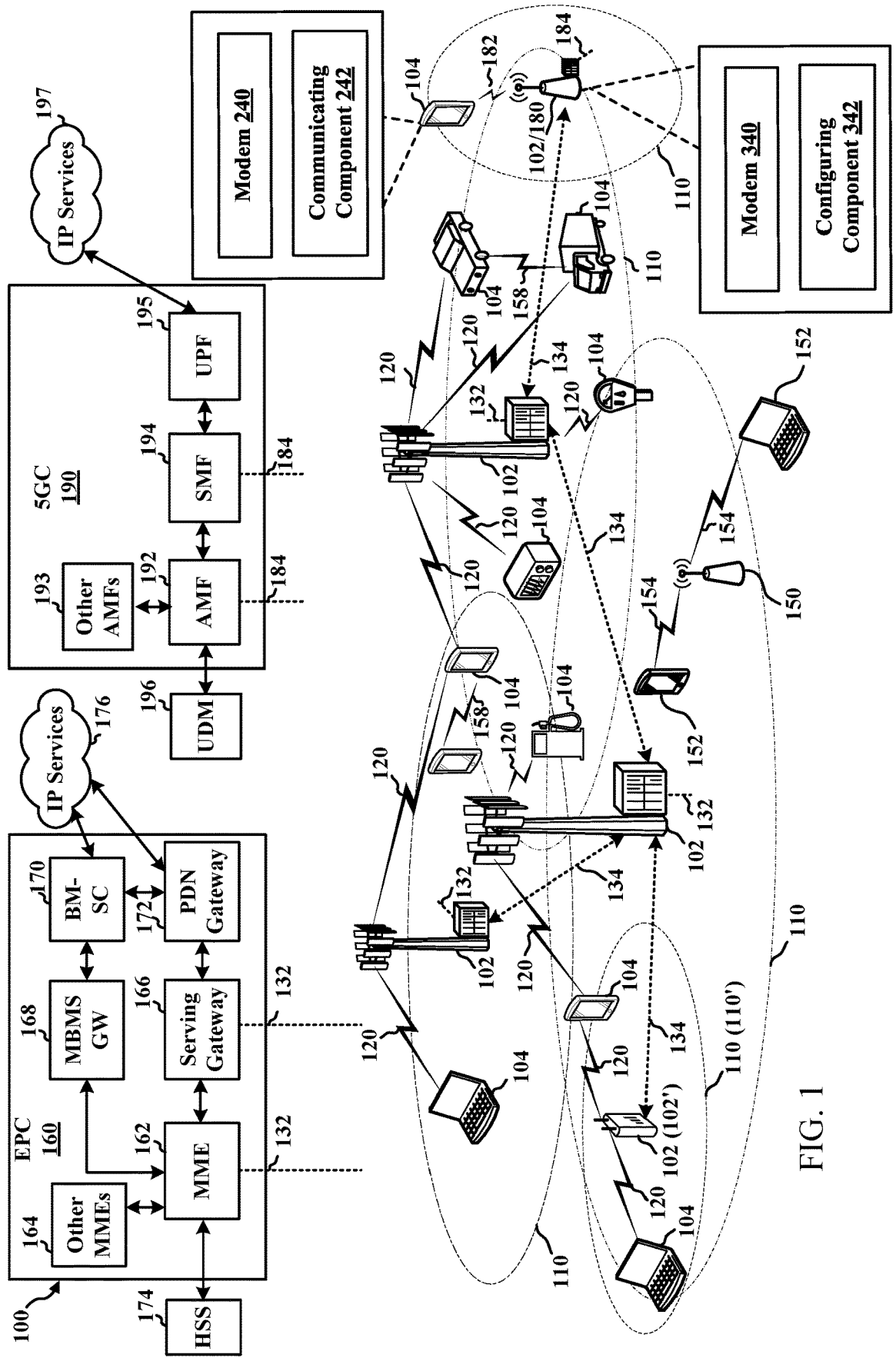
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to determining symbols over which to transmit repetitions for certain types of communications. As described, in some communication technologies, a resource grant can include information for transmitting a number of repetitions over a collection of resources. For example, the resource grant can indicate a starting symbol over which to transmit communications, a number of symbols over which to transmit communications, and/or a nominal number of repetitions to transmit (e.g., where the actual number of repetitions can be larger than the nominal number). In addition, where time division multiplexing (TDM) communications are configured, a slot format indicator (SFI) can be semi-statically configured and can indicate a communication direction of symbols within one or more slots as being uplink (e.g., reserved for uplink communications), downlink (e.g., reserved for downlink communications), or flexible (e.g., useable or subsequently reserveable for uplink or downlink communications). Moreover, in some examples, a dynamic SFI can be configured to indicate whether the flexible symbols are to be downlink or uplink symbols, and/or to otherwise modify the semi-static SFI. In yet another example, a resource grant may schedule downlink or uplink resources over the flexible symbols with or without using the dynamic SFI to update the communication direction for the flexible symbols.

In an example, a time domain resource assignment (TDRA) field in downlink control information (DCI) or a TDRA parameter in a type 1 configured grant (CG) can indicate a resource for a first nominal repetition (e.g., a first transmission), and a number of remaining repetitions can be derived based at least on the resources for the first repetition and the communication direction of the symbols (e.g., based on semi-static or dynamic SFI, based on a resource grant, etc.). If symbols determined for a nominal repetition spans across the slot boundary or a downlink/uplink switching point, this nominal repetition can be split into multiple repetitions, with one repetition in each uplink period in a slot. With various possibilities for indicating communication direction of a symbol (e.g., semi-static SFI, dynamic SFI, DCI or other resource grant information, etc.), however, there can be multiple options for determining the communication direction of the symbol based on received information.

For example, fifth generation (5G) new radio (NR) communication technologies can include enhanced mobile broadband (eMBB) communications or ultra-reliable-low latency communications (URLLC) communications, or otherwise a first and second type of communications where one type (e.g., URLLC communications) can include communications having more stringent reliability and/or latency requirements than the other type (e.g., eMBB communications). Additionally, though the terms URLLC and eMBB are used to described types of communications herein, the concepts can be applied to substantially any two types of communications where one type has more stringent reliability and/or latency requirements than the other type. In addition, for example, in 5G NR communications technologies, processes for determining symbols for communicating using eMBB or URLLC can be different. In one example, processes for determining a communication direction for using the symbols can be different for eMBB or URLLC. In another example, processes for mapping repetitions to the symbols can also be different for eMBB or URLLC. Typically, a dynamic SFI received after a semi-static SFI can be used to modify the semi-static SFI or to otherwise indicate communication direction for flexible symbols. Dynamic SFI may not be transmitted or designed based on reliability metrics associated with URLLC, and for at least URLLC, dynamic SFI may not be relied upon for indicating or updating the indication of communication direction for symbols. Thus, in one example, dynamic SFI may be ignored for URLLC traffic, and a user equipment (UE) configured for URLLC communication can accordingly determine symbols for transmitting repetitions based on the communication direction indicated in semi-static SFI. This can be the case for dynamic uplink shared channel resource grants for URLLC communications and/or for the first transmission activated by DCI, and corresponding repetitions, for type 2 configured grants, which are further described herein. In these examples, flexible symbols may be considered as uplink or downlink in certain examples described herein. Considering flexible symbols as uplink, however, may cause issue where there may be a downlink (e.g., URLLC DL) scheduled on those symbols (e.g., to the same UE or other UEs). In other examples, other mechanisms can be used to indicate whether flexible symbols can be considered as uplink or downlink for mapping repetitions to at least the flexible symbols.

In one example, a bit or bitmap may be used to indicate whether symbols or groups of symbols indicated as flexible in a semi-static SFI are to be considered or used as uplink symbols or not. In another example, DCI can be used to determine whether symbols indicated as flexible in a semi-static SFI are to be considered or used as uplink symbols, where the gNB can ensure flexible symbols indicated by the DCI are not used for downlink communications. In another example, the bitmap or DCI can be used for URLLC communications and/or eMBB communications for a UE. In yet another example, a UE may be configured to rely on dynamic SFI for eMBB communications.

In another example, repetitions can be determined for configured grants in the presence of downlink symbols. For example, a configured grant can refer to a resource grant that is configured using radio resource control (RRC) layer signaling. A configured grant can include a type 1 grant, which is configured and activated using RRC layer signaling, and a type 2 grant, which is configured using RRC signaling and then activated based on layer 1 (e.g., physical layer) signaling. For repetitions of URLLC communications transmitted over resources indicated by type 1 grant and for repetitions of URLLC communications, other than the first transmission, transmitted over resources indicated by type 2 grant, if the UE is configured to monitor for (e.g., rely on) dynamic SFI, the UE can ignore dynamic SFI due to low priority and can use symbols indicated as uplink in the semi-static SFI to transmit repetitions, such that a nominal repetition may be segmented if it uses symbols that cross the slot boundary or include symbols indicated as downlink or flexible in the semi-static SFI. In this example, where the UE is not configured to monitor for dynamic SFI, the UE can use symbols indicated as uplink or flexible in the semi-static SFI to transmit repetitions, such that a nominal repetition may be segmented if it uses symbols that cross the slot boundary or include symbols indicated as downlink in the semi-static SFI. For example, the UE can be higher-layer configured or dynamically indicated (e.g., in DCI, such as activation DCI in a type 2 grant) whether to rely on dynamic SFI or not, which can be based on a received configuration or indication.

In another example, in determining symbols over which to transmit repetitions, a transition number of symbols used by a UE to transition from downlink to uplink communications can be considered. In one example, the transition number of symbols can be at least partially mapped to downlink or flexible symbols based on an assumption that the gNB does not schedule a UE to receive downlink communications within the transition number of symbols before an uplink symbol. In the above examples, the UE can accordingly determine communication direction of symbols and/or how to use the symbols to effectively map repetitions of uplink communications based on corresponding resource grants.

The described features will be presented in more detail below with reference to FIGS. 1-14.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for determining resources over which to transmit repetitions. In addition, some nodes may have a modem 340 and configuring component 342 for configuring or otherwise enabling usage of resources for transmitting repetitions, as described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, configuring component 342 can indicate SFI to one or more UEs 104, which can include semi-static SFI and/or dynamic SFI. Communicating component 242 of a UE 104 can receive, from the base station 102, the SFI and can determine a communication direction for symbols in a slot (also referred to as symbol direction) as being downlink or uplink based at least in part on at least one SFI. As described, (e.g., at least for URLLC), a dynamic SFI may be ignored and/or configuring component 342 can use other mechanisms to more reliably indicate communication direction of flexible symbols (e.g., an indicator in DCI). In addition, in an example, communicating component 242 can determine mapping of repetitions (e.g., a first transmission and/or repetitions thereof) over a set of resources based at least in part on the determined communication directions, as described further herein.

Turning now to FIGS. 2-14, aspects are depicted with reference to one or more components and one or more methods that may perform the actions or operations described herein, where aspects in dashed line may be optional. Although the operations described below in FIGS. 4, 5, 7, 8, 10, 11, and 13 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
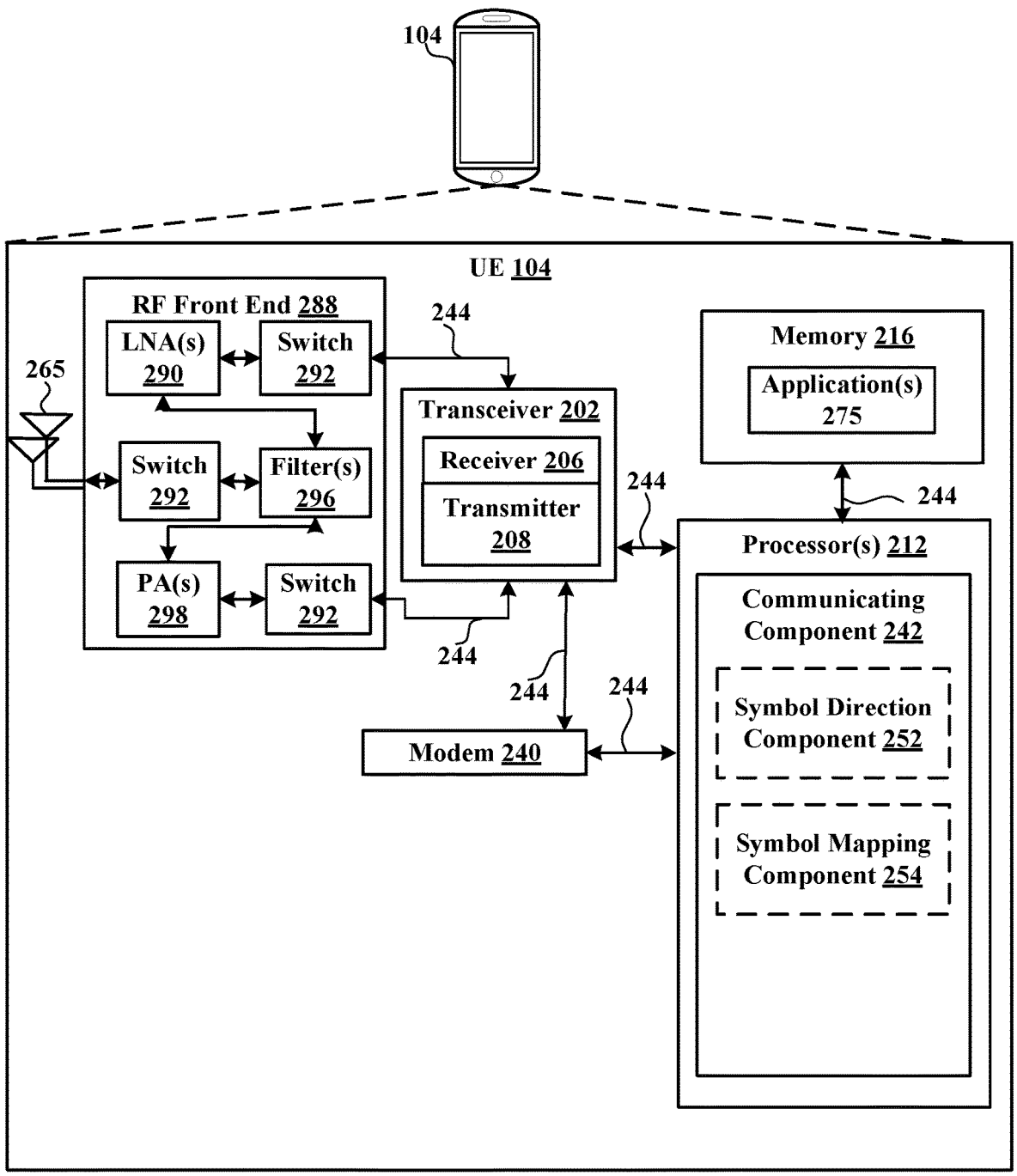
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for transmitting one or more repetitions of an uplink communication over symbols in one or more slots.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a symbol direction component 252 for determining a communication direction of one or more symbols in a slot based on one or more SFIs (e.g., a semi-static SFI and/or dynamic SFI), a DCI, resource grant, and/or the like, and/or a symbol mapping component 254 for mapping one or more symbols for transmitting one or more repetitions of an uplink communication based at least in part on the determined communication direction of the symbols and/or on information from a resource grant such as a starting symbol, number of symbols, number of nominal repetitions, etc.

In an aspect, the processor(s) 212 may correspond to one or more of the processors described in connection with the UE in FIG. 14. Similarly, the memory 216 may correspond to the memory described in connection with the UE in FIG. 14.

Figure 3:
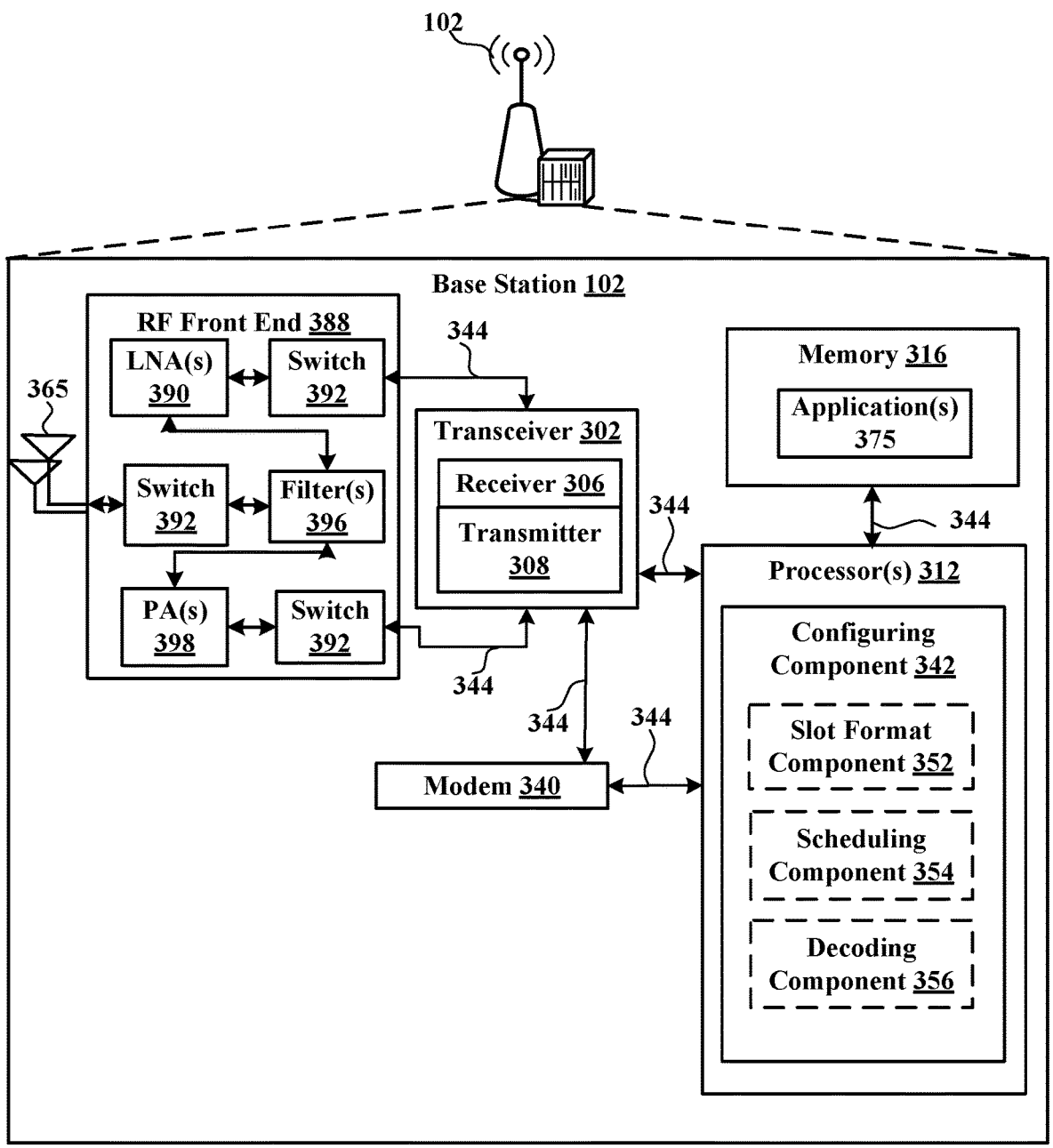
FIG. 3 is a block diagram illustrating an example of a base station, in accordance with various aspects of the present disclosure.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for scheduling or otherwise enabling usage of resources for transmitting one or more repetitions of an uplink communication.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a slot format component 352 for indicating a slot format specifying communication direction of symbols within a slot, which can be in the form of semi-static SFI, dynamic SFI, DCI, resource grant, etc., as described, a scheduling component 354 for scheduling resource to a UE 104 for transmitting uplink communications and corresponding repetitions thereof, and/or a decoding component 356 for decoding the uplink communications and/or corresponding repetitions thereof over scheduled resources, where the resources may be determined based on one or more of the SFIs communicated to the UE 104.

In an aspect, the processor(s) 312 may correspond to one or more of the processors described in connection with the base station in FIG. 14. Similarly, the memory 316 may correspond to the memory described in connection with the base station in FIG. 14.

Figure 4:
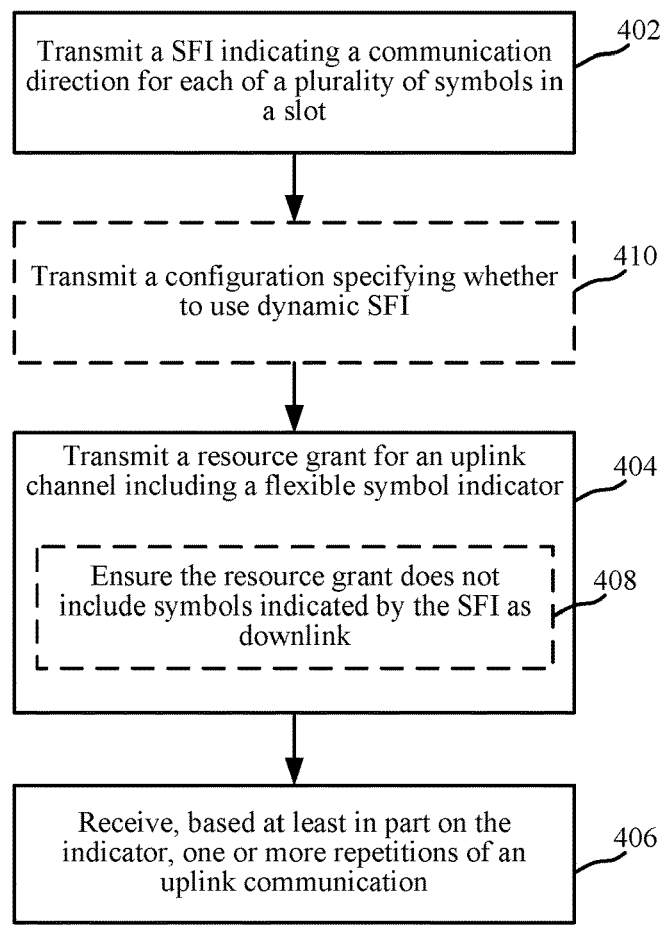
FIG. 4 is a flow chart illustrating an example of a method for indicating a flexible symbol indicator and receiving one or more repetitions, in accordance with various aspects of the present disclosure.
Figure 5:
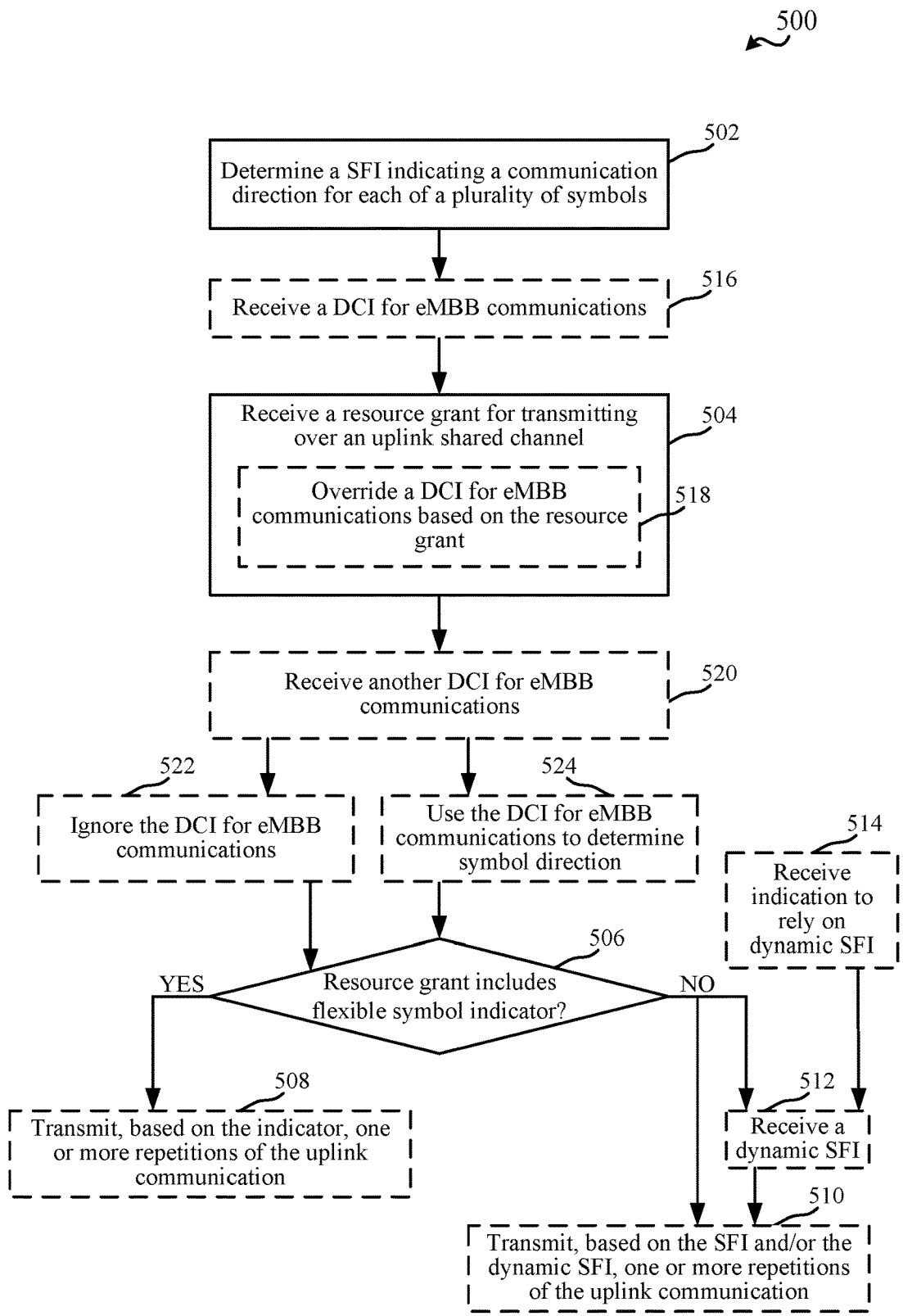
FIG. 5 is a flow chart illustrating an example of a method for determining a flexible symbol indicator and transmitting one or more repetitions based on the indicator, in accordance with various aspects of the present disclosure.

FIG. 4 illustrates a flow chart of an example of a method 400 for configuring a communication direction of one or more symbols and receiving one or more corresponding repetitions of an uplink communication in accordance with aspects described herein. FIG. 5 illustrates a flow chart of an example of a method 500 for transmitting one or more repetitions based on determining communication direction of one or more symbols in accordance with aspects described herein. Method 400 and 500 are described in conjunction with one another for ease of explanation, though the methods 400 and 500 are not required to be performed in conjunction. In one example, a base station 102 can perform the functions described in method 400 using one or more of the components described in FIGS. 1 and 3, and a UE 104 can perform the functions described in method 500 using one or more of the components described in FIGS. 1 and 2.

In method 400, at Block 402, a SFI indicating a communication direction for each of a plurality of symbols in a slot can be transmitted. In an aspect, slot format component 352, e.g., in conjunction with processor(s) 312, memory 316, transceiver 302, configuring component 342, etc., can transmit the SFI indicating the communication direction for each of the plurality of symbols in the slot. For example, slot format component 352 can generate the SFI to indicate a communication direction of each of multiple symbols in a slot to be downlink, uplink, or flexible, where flexible symbols can be later used and/or indicated as downlink or uplink. Slot format component 352 can generate one or more than one SFI, which may include a semi-static SFI that can be configured using RRC signaling, broadcast signaling (e.g., system information block (SIB)) and/or the like, a dynamic SFI that can be configured using DCI (e.g., over a physical downlink control channel (PDCCH)), etc. In one example, dynamic SFI can be used to indicate a communication direction for symbols identified as flexible in the semi-static SFI, or can be used to modify or override communication direction of one or more symbols indicated in the semi-static SFI, and/or the like. In an example, slot format component 352 can generate the SFI(s) to achieve a desired ratio of downlink to uplink communications, which may be based on cell capacity, a number of UEs communicating in the cell, buffer status reports received from the UEs and/or the like.

In method 500, at Block 502, a SFI indicating a communication direction for each of a plurality of symbols in a slot can be determined. In an aspect, symbol direction component 252, e.g., in conjunction with processor(s) 212, memory 216, transceiver 202, communicating component 242, etc., can determine the SFI indicating the communication direction for each of the plurality of symbols in the slot. For example, symbol direction component 252 can receive the SFI including one or more SFIs from one or more base stations 102, which may include a semi-static SFI (e.g., received via RRC signaling), a dynamic SFI (e.g., received via PDCCH signaling), and/or the like. In one example, where the UE 104 is configured for URLLC communications (e.g., communications having reliability and/or latency constraints that may be more stringent than for other communications), symbol direction component 252 may ignore a dynamic SFI, as the reliability associated with dynamic SFI may not comply with URLLC constraints.

In method 400, at Block 404, a resource grant can be transmitted for an uplink channel including a flexible symbol indicator. In an aspect, scheduling component 354, e.g., in conjunction with processor(s) 312, memory 316, transceiver 302, configuring component 342, etc., can transmit the resource grant for the uplink channel (e.g., physical uplink shared channel (PUSCH)) including the flexible symbol indicator. For example, the flexible symbol indicator may be based on DCI or a DCI format indicated in the resource grant. The flexible symbol indicator may include one or more parameters specifying whether one or more symbols indicated by the SFI (e.g., the semi-static SFI) as flexible can or cannot be used for uplink communications. In one example, the flexible symbol indicator may include a bit indicator of whether one or more symbols (e.g., symbols defined as flexible in the SFI) can be used as uplink symbols, a bitmap where a value of each bit in the bitmap can correspond to a symbol in a slot or a collection or group of symbols in the slot and the value itself can indicate whether the corresponding symbol or group of symbols can or cannot be used for uplink communications, etc. The flexible symbol indicator can be sent in a URLLC resource grant such to comply with the reliability constraints of URLLC.

Additionally, the resource grant may include, for example, parameters related to a starting symbol (e.g., orthogonal frequency division multiplexing (OFDM) symbol, single-carrier frequency division multiplexing (SC-FDM) symbol, etc.) over which to begin transmitting an uplink communication, a number of symbols over which to transmit the uplink communication and/or related repetitions, and/or a nominal number of repetitions (e.g., including a first transmission) to transmit of the uplink communication. In an example, the number of symbols may correspond to a consecutive number of symbols in one or more slots, and thus the UE 104 can determine whether to segment the repetitions over symbols based on the SFI and/or other considerations described herein.

In method 500, at Block 504, a resource grant for transmitting over an uplink shared channel can be received. In an aspect, communicating component 242, e.g., in conjunction with processor(s) 212, memory 216, transceiver 202, etc., can receive the resource grant for transmitting over the uplink shared channel. For example, communicating component 242 may receive the resource grant as DCI scheduling PUSCH for URLLC, and the DCI may include information regarding the starting symbol, number of symbols, number of nominal repetitions, etc. In another example, communicating component 242 may receive the resource grant as activating a type 2 configured grant. In this example, communicating component 242 may have received information regarding the type 2 grant in RRC signaling, which may have included one or more parameters of the grant, such as the starting symbol, number of symbols, number of nominal repetitions, etc., and then received an activation DCI including one or more parameters that may relate to activating the defined type 2 configured grant. In addition, in either case for example, the resource grant or DCI may also include the flexible symbol indicator to indicate which symbols, indicated as flexible in the semi-static SFI, may or may not be used for uplink communications.

In method 500, at Block 506, it can be determined whether the resource grant includes a flexible symbol indicator. In an aspect, symbol direction component 252, e.g., in conjunction with processor(s) 212, memory 216, transceiver 202, communicating component 242, etc., can determine whether the resource grant includes the flexible symbol indicator. For example, the resource grant or DCI may include the flexible symbol indicator, as described, as an indication of whether one or more symbols indicated as flexible by the semi-static SFI can (or cannot) be used for uplink communications. In one example, the flexible symbol indicator may be a bitmap having bits for each symbol or for groups of symbols to indicate whether the symbol(s) may or may not be used for uplink communications.

In a specific example, the flexible symbol indicator may be a bitmap of length m bits in the DCI scheduling PUSCH (or activating type 2 CG), where m bits can represent a one-to-one mapping with m groups of symbols from the set of N_Flex symbols. For each group of symbols that its corresponding bit is 1, UE 104 cannot use symbols indicated as flexible in the semi-static SFI (also referred to herein as "X" symbols) within the group as uplink symbols (also referred to herein as "U" symbols) for uplink repetition. In one example, N_Flex can represent a number of symbols from the last symbol of the first nominal PUSCH until the end of K×L absolute symbols (where K can be the number of nominal repetitions indicated for the resource grant and L can be the number of symbols for the first uplink transmission indicated for the resource grant), excluding symbols indicated as downlink or uplink by the semi-static SFI (e.g., in a specific example, symbols indicated by TDD-UL-DL-ConfigurationCommon and/or TDD-UL-DL-ConfigDedicated as downlink or uplink). In another example, N_Flex can represent a number of symbols from the first symbol of the first nominal PUSCH until the end of K×L absolute symbols, excluding symbols indicated as downlink or uplink by the semi-static SFI (e.g., in the specific example, symbols indicated by TDD-UL-DL-ConfigurationCommon and/or TDD-UL-DL-ConfigDedicated as downlink or uplink). In yet another example, N_Flex can represent a number of symbols in either of the above examples further excluding a transition number of symbols defined for allowing transitioning from downlink to uplink and/or defined for allowing application of a timing advance. For example, N_Flex can be obtained as in one or more of the above examples (e.g., as a number of symbols from the last symbol of the first nominal PUSCH until the end of K×L absolute symbols, or from the first symbol of the first nominal PUSCH until the end of K×L absolute symbols, excluding symbols indicated as downlink or uplink by the semi-static SFI), and may further be obtained to exclude one or more of: symbols required to apply TA and transition, if any; symbols indicated to a UE for reception of synchronization signal block (SSB) blocks; and/or symbols indicated to a UE for a control resource set (CORESET) for Type0-PDCCH common search space (CSS).

In an example, N_Flex can represent all symbols indicated as flexible in SFI but excluding the transition symbols, synchronization symbols, and/or CORESET symbols. In addition, in this example, the bitmap can be a bitmap of a single bit in size to indicate whether the symbols indicated as flexible in SFI (but excluding the transition symbols, synchronization symbols, and/or CORESET symbols) can be used for uplink communications.

In addition, in one example, the base station 102 may schedule the UE 104 with resources for transmitting and receiving communications each in different bandwidth parts (BWPs) and/or may schedule the UE 104 using frequency division duplexing (FDD). In these examples, the UE 104 may not be likely to be assigned downlink resources in the uplink BWP or other frequency part, and thus the flexible symbol indicator may not be needed. Thus, for example, symbol direction component 252 may apply the flexible symbol indicator within a BWP or frequency indicated by the resource grant to which the flexible symbol indicator relates.

In method 500, where it is determined that the resource grant includes the flexible symbol indicator, optionally at Block 508, one or more repetitions of the uplink communication can be transmitted based on the indicator. In an aspect, communicating component 242, e.g., in conjunction with processor(s) 212, memory 216, transceiver 202, etc., can transmit, based on the indicator, the one or more repetitions of the uplink communication. For example, symbol mapping component 254 can map the one or more repetitions onto the symbols based on the flexible symbol indicator such to use flexible symbols indicated by the flexible symbol indicator as usable for uplink communications or such to not use flexible symbols not indicated by the flexible symbol indicator as usable (and/or flexible symbols that may correspond to the transition symbols, synchronization symbols, and/or CORESET symbol) for uplink communications. For example, symbol mapping component 254 can map a first transmission at the starting symbol and continuing a number of symbols (e.g., L symbols), and segmenting the transmission over symbols indicated by the SFI as downlink or as indicated by the SFI as flexible where the flexible symbol indicator indicates the flexible symbol cannot be used for uplink. Symbol mapping component 254, in this example, can then map a repetition of the first transmission starting at a next symbol indicated by the SFI as uplink or as indicated by the SFI as flexible where the flexible symbol indicator indicates the flexible symbol can be used for uplink, and may similarly segment this repetition if needed based on the SFI and/or flexible symbol indicator and/or if the repetition crosses a slot boundary, etc.

Figure 6:
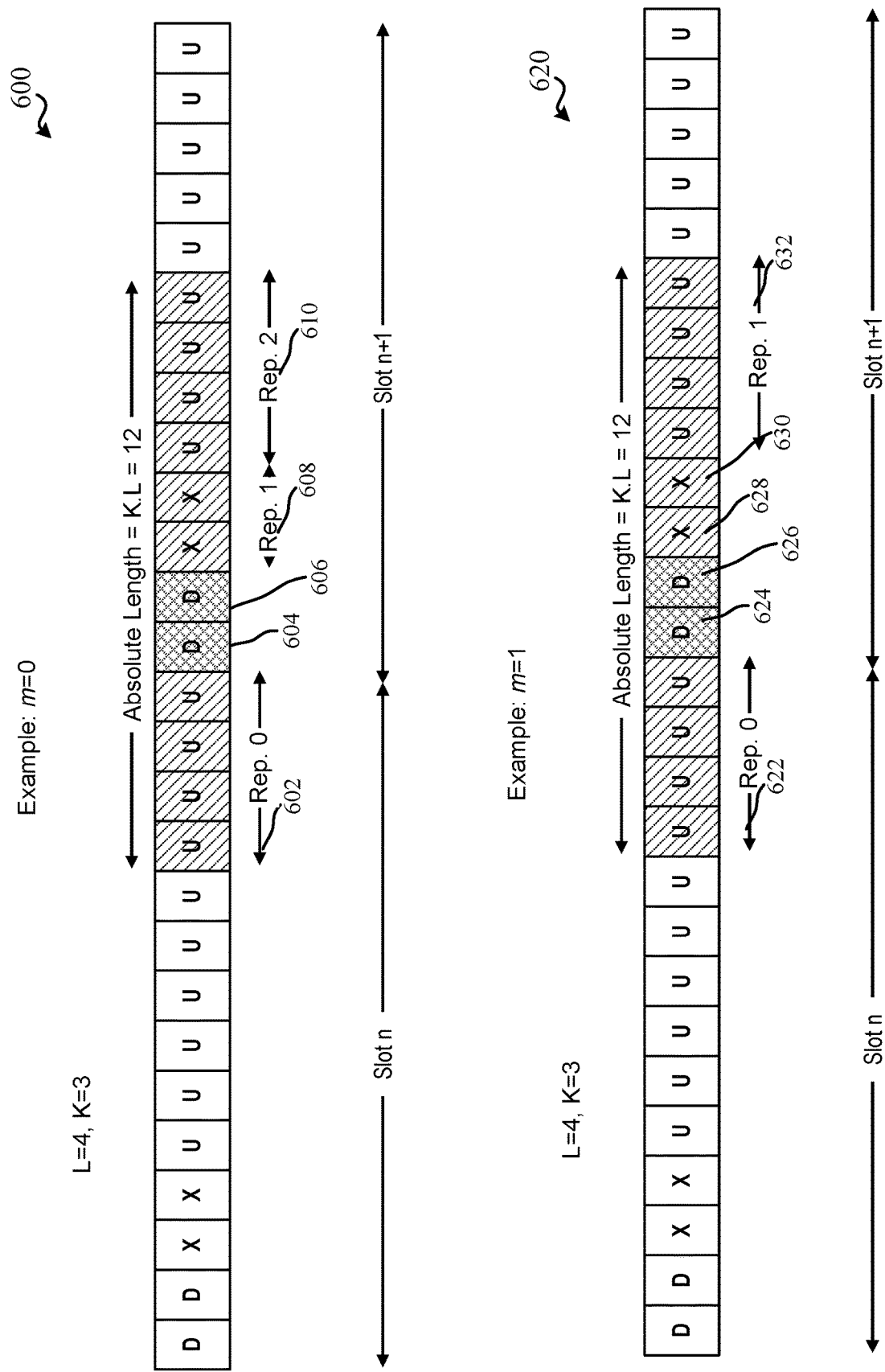
FIG. 6 illustrates an example of slot configurations for transmitting one or more repetitions based on a flexible symbol indicator, in accordance with various aspects of the present disclosure.

Examples are shown in FIG. 6, which illustrates an example of a slot configuration 600 where the SFI can indicate symbols 602 as uplink, symbols 604, 606 as downlink, symbols 608 as flexible, and symbols 610 as uplink. In this example, the flexible symbol indicator can be m=0, where m is a 1-bit bitmap referring to the (only) group of flexible symbols 608 occurring after the first uplink transmission over symbols 602. In this example, the value of 0 can indicate that the flexible symbols 608 can be used for uplink. Thus, symbol mapping component 254 can map a repetition of the uplink transmission over the flexible symbols 608. In addition, to maintain the number of nominal repetitions (K=3), symbol mapping component 254 can map the repetition only over the flexible symbols 608, as symbols 604, 606 are indicated, by the SFI, as reserved for downlink. Symbol mapping component 254 can then map another repetition over symbols 610.

FIG. 6 also illustrates an example of a slot configuration 620 where the SFI can indicate symbols 622 as uplink, symbols 624, 626 as downlink, symbols 628, 630 as flexible, and symbols 632 as uplink. In this example, the flexible symbol indicator can be m=1, where m is a 1-bit bitmap referring to the (only) group of flexible symbols 628, 630 occurring after the first uplink transmission over symbols 622. In this example, the value of 1 can indicate that the flexible symbols 628, 630 cannot be used for uplink. Thus, symbol mapping component 254 can skip downlink symbols 624, 626, and flexible symbols 628, 630, and can map the repetition only over uplink symbols 632.

In method 400, at Block 406, one or more repetitions of an uplink communication can be received based at least in part on the indicator. In an aspect, decoding component 356, e.g., in conjunction with processor(s) 312, memory 316, transceiver 302, configuring component 342, etc., can receive and/or decode, based at least in part on the indicator, one or more repetitions of the uplink communication. For example, decoding component 356 can determine one or more symbols to which the uplink communication is to be mapped based on the SFI and flexible symbol indicator, as described above, and can accordingly receive and/or decode the uplink communication from the one or more symbols, which may include skipping receiving or decoding of symbols indicated as downlink, transition symbols, synchronization symbols, CORESET symbols, etc., as described herein.

In method 500, where it is determined that the resource grant does not include the flexible symbol indicator, optionally at Block 510, one or more repetitions of the uplink communication can be transmitted based on the SFI and/or a dynamic SFI. In an aspect, communicating component 242, e.g., in conjunction with processor(s) 212, memory 216, transceiver 202, etc., can transmit, based on the SFI and/or the dynamic SFI, the one or more repetitions of the uplink communication. In one example, where the resource grant does not include the flexible symbol indicator (e.g., where the bitmap or field is not configured), the UE 104 can be indicated to rely on the DCI (for dynamic PUSCH or activating type 2 CG) for determining the symbol mapping, which may also be based on the received SFI (e.g., semi-static and/or dynamic, as described in further examples herein). In other words, in an example, all symbols within K×L symbols starting from symbol S given by DCI can be usable for UL transmission. In this case, in an example, the base station may ensure, in generating the resource grant, that there are no conflicting D (semi-static and/or dynamic) symbols in between.

In this regard, in transmitting the resource grant at Block 404, optionally at Block 408, it can be ensured that the resource grant does not include symbols indicated by the SFI as downlink. In an aspect, scheduling component 354, e.g., in conjunction with processor(s) 312, memory 316, transceiver 302, configuring component 342, etc., can ensure the resource grant does not include symbols indicated by the SFI as downlink. For example, scheduling component 354 can ensure the semi-static SFI and/or dynamic SFI do not indicate the symbols to be included in the resource grant as downlink (nor indicate flexible symbols to be included in the resource grant as downlink).

In another example, methods 400 and 500, as described so far, may be applied for eMBB PUSCH as well. In another example, a UE 104 configured for eMBB communications may be configured or dynamically indicated (e.g. through a reserved code-point out of m bit) to rely on dynamic SFI, if configured, to determine symbol direction as downlink or uplink (e.g., where the dynamic SFI can indicated whether flexible symbols are to be used for downlink or uplink, as described). For example, in method 400, optionally at Block 410, a configuration specifying whether to use dynamic SFI can be transmitted. In an aspect, configuring component 342, e.g., in conjunction with processor(s) 312, memory 316, transceiver 302, etc., can transmit the configuration specifying whether to use dynamic SFI. In one example, configuring component 342 can transmit the configuration for eMBB configured communications. In addition, the configuration may be transmitted using RRC signaling, DCI, PDCCH, etc.

In this example, in method 500, optionally at Block 512, a dynamic SFI can be received and/or optionally at Block 514, an indication to rely on dynamic SFI can be received. In an aspect, symbol direction component 252, e.g., in conjunction with processor(s) 212, memory 216, transceiver 202, communicating component 242, etc., can receive the dynamic SFI and/or receive the indication to rely on dynamic SFI, as described above. In this example, communicating component 242 cam transmit, based on the SFI and/or the dynamic SFI, one or more repetitions of the uplink communications (e.g., as explained above with respect to Block 510). For example, for dynamic PUSCH and activation Type 2 eMBB PUSCH, this can include transmitting over the symbols and/or segmenting at symbols indicated by the semi-static SFI as downlink, symbols indicated by the semi-static SFI as flexible and the dynamic SFI as downlink, symbols that cross a slot boundary, etc., as described.

In addition, in an example, a UE 104 may not expect to receive another DCI indicating downlink reception for eMBB within the set of flexible symbols indicated to be usable for uplink by m bits within URLLC PUSCH DCI, as described above, after the UE 104 receives URLLC PUSCH DCI. Thus, for example, where in method 500, optionally at Block 516, a DCI is received for eMBB communications (or another type of communications not having the same reliability and/or latency requirements as the communications relating to the resource grant), receiving the resource grant at Block 504 may optionally include, at Block 518, overriding a DCI for eMBB communications based on the resource grant. In an aspect, symbol direction component 252, e.g., in conjunction with processor(s) 212, memory 216, transceiver 202, communicating component 242, etc., can, where it receives a DCI for eMBB communications, override the DCI for eMBB communications (or another type of communications) based on the resource grant. In this example, symbol direction component 252 can ignore the DCI for eMBB (or another type of communications) and accordingly determine symbol direction and/or otherwise determine mapping of repetitions onto symbols based on the resource grant instead.

In addition, for example, m bits within URLLC PUSCH DCI can overwrite/cancel/preempt a previous DCI indicating DL reception for eMBB (or another type of communications) within the set of flexible symbols indicated, and the UE 104 can accordingly rely on URLLC PUSCH DCI. Thus, for example, in method 500, optionally at Block 520, another DCI for eMBB communications may be received following receiving the resource grant at Block 504. In an aspect, symbol direction component 252, e.g., in conjunction with processor(s) 212, memory 216, transceiver 202, communicating component 242, etc., can receive the DCI for eMBB communications (or another type of communications) where received after the resource grant. In certain examples, symbol direction component 252 can ignore or use the DCI received for eMBB communications (or another type of communications) in determining communication direction of the symbols.

For example, method 500 may optionally include, at Block 522, ignoring the DCI received (at Block 520) for eMBB communications In an aspect, symbol direction component 252, e.g., in conjunction with processor(s) 212, memory 216, transceiver 202, communicating component 242, etc., can ignore the DCI for eMBB communications (or another type of communications). In this regard, symbol direction component 252 can rely on the resource grant for determining symbol direction and/or mapping of repetitions onto the symbols as described above. In an example, symbol direction component 252 may ignore the DCI for eMBB communication (or another type of communications) based on a capability (or lack of an indicated capability) of the UE 104, where the transmitting/receiving assignments are in the same BWP, etc. Method 500 can proceed to Block 506, as described above.

In another example, method 500 may optionally include, at Block 524, using the DCI received (at Block 520) for eMBB communications to determine symbol direction In an aspect, symbol direction component 252, e.g., in conjunction with processor(s) 212, memory 216, transceiver 202, communicating component 242, etc., can use the DCI for eMBB communications (or another type of communications) to determine symbol direction. In this example, symbol direction component 252 can accordingly consider both the resource grant received at Block 504 (e.g., and/or the corresponding DCI) and the DCI for eMBB communications (or another type of communications) received at Block 520 for transmitting and receiving on the same set of symbols. In one example, symbol direction component 252 can use both DCIs based on a capability of the UE 104 and/or where the transmitting/receiving assignments are in different BWPs or the UE 104 and base station 102 are communicating using FDD. In addition, as described above in an example, the flexible symbol indicator (e.g., the bitmap) in PUSCH DCI may be applied only within the assignment and/or BWP. Method 500 can proceed to Block 506, as described above.

Figure 7:
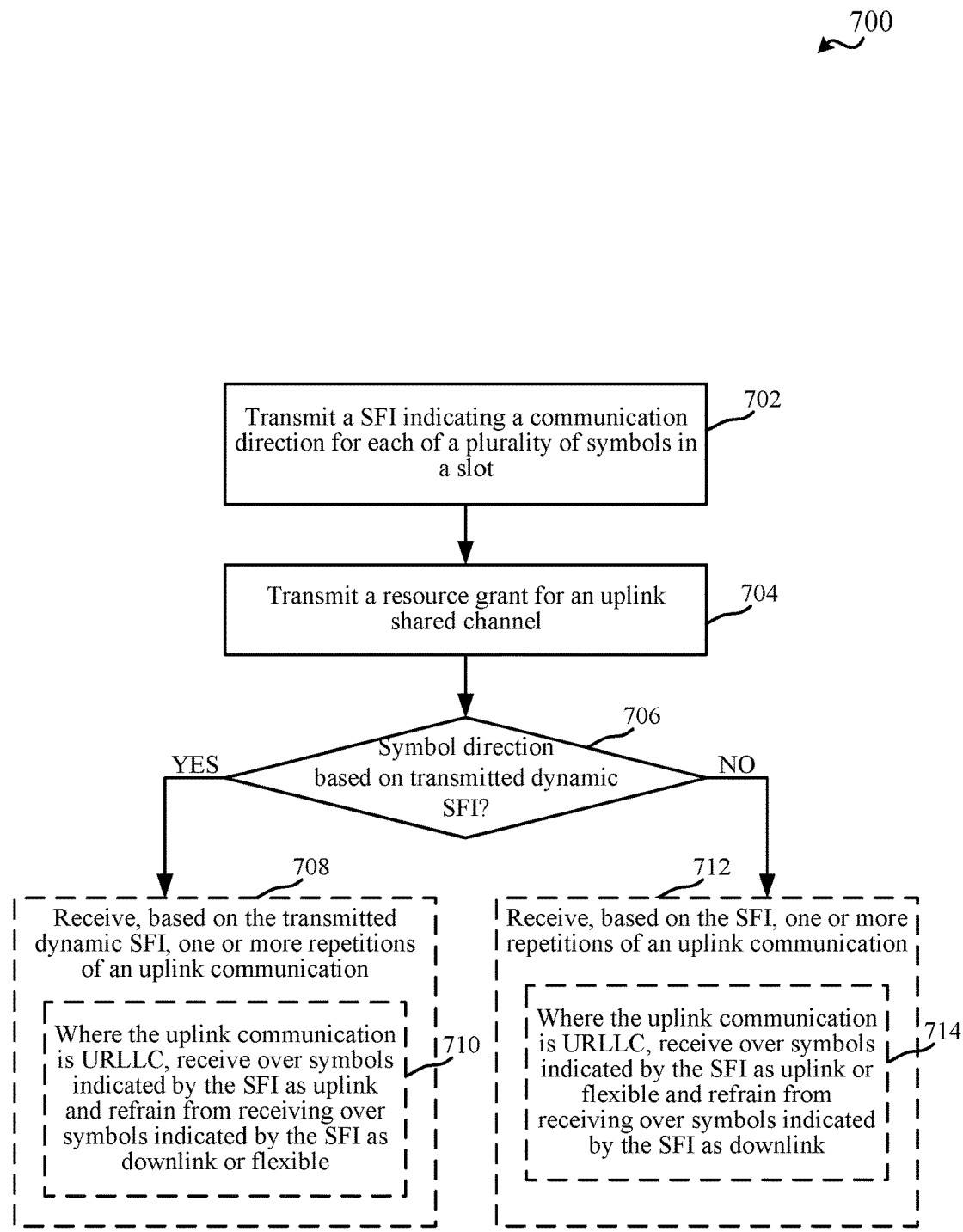
FIG. 7 is a flow chart illustrating an example of a method for receiving one or more repetitions based on determining whether to consider a dynamic slot format indicator (SFI), in accordance with various aspects of the present disclosure.
Figure 8:
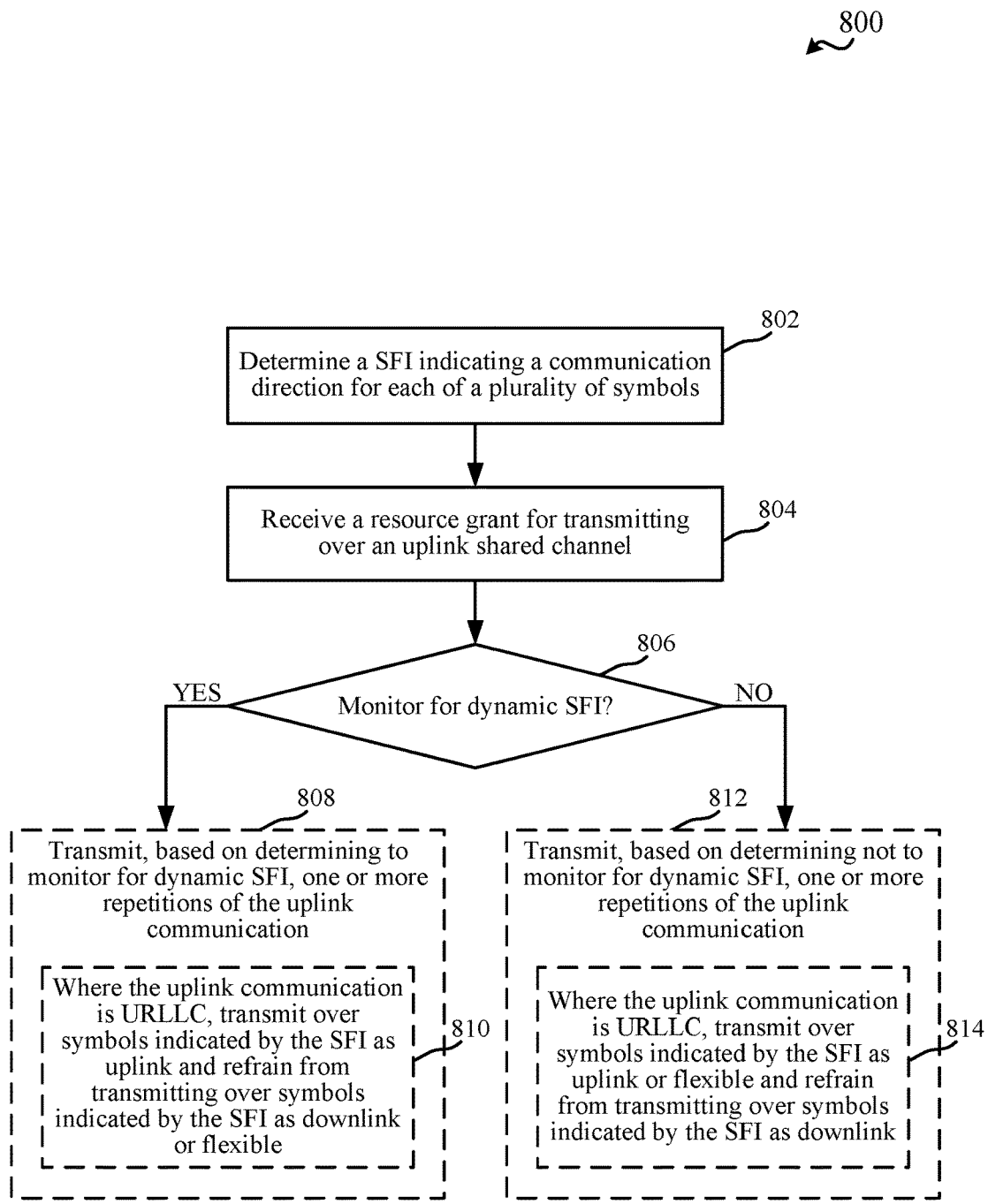
FIG. 8 is a flow chart illustrating an example of a method for transmitting one or more repetitions based on determining whether to monitor for dynamic SFI, in accordance with various aspects of the present disclosure.

FIG. 7 illustrates a flow chart of an example of a method 700 for receiving one or more repetitions of an uplink communication in accordance with aspects described herein. FIG. 8 illustrates a flow chart of an example of a method 800 for transmitting one or more repetitions based on determining communication direction of one or more symbols in accordance with aspects described herein. Methods 700 and 800 are described in conjunction with one another for ease of explanation, though the methods 700 and 800 are not required to be performed in conjunction. In one example, a base station 102 can perform the functions described in method 700 using one or more of the components described in FIGS. 1 and 3, and a UE 104 can perform the functions described in method 800 using one or more of the components described in FIGS. 1 and 2.

In method 700, at Block 702, a SFI indicating a communication direction for each of a plurality of symbols in a slot can be transmitted. In an aspect, slot format component 352, e.g., in conjunction with processor(s) 312, memory 316, transceiver 302, configuring component 342, etc., can transmit the SFI indicating the communication direction for each of the plurality of symbols in the slot, as described above in connection with Block 402 of method 400.

In method 800, at Block 802, a SFI indicating a communication direction for each of a plurality of symbols in a slot can be determined. In an aspect, symbol direction component 252, e.g., in conjunction with processor(s) 212, memory 216, transceiver 202, communicating component 242, etc., can determine the SFI indicating the communication direction for each of the plurality of symbols in the slot, as described above in connection with Block 502 of method 500.

In method 700, at Block 704, a resource grant can be transmitted for an uplink shared channel. In an aspect, scheduling component 354, e.g., in conjunction with processor(s) 312, memory 316, transceiver 302, configuring component 342, etc., can transmit the resource grant for the uplink shared channel (e.g., PUSCH), as described above in connection with Block 404 of method 400, but where the resource grant may or may not include the flexible symbol indicator. In addition, in this example, scheduling component 354 may transmit the resource grant as a type 1 CG (e.g., using RRC signaling to indicate parameters related to the scheduled resources) or as a type 2 CG (e.g., using RRC signaling to indicate parameters related to the scheduled resources and an activation DCI to activate the resources).

In method 800, at Block 804, a resource grant for transmitting over an uplink shared channel can be received. In an aspect, communicating component 242, e.g., in conjunction with processor(s) 212, memory 216, transceiver 202, etc., can receive the resource grant for transmitting over the uplink shared channel, as described above in connection with Block 504 of method 500, but where the resource grant may or may not include the flexible symbol indicator. Additionally, as described the received resource grant can include a type 1 CG or type 2 CG received in RRC signaling and/or with an associated activation DCI. In examples described herein, transmission of repetitions may be different depending on whether the UE 104 is configured to monitor for dynamic SFI and/or based on whether the UE 104 is configured for URLLC or eMBB (or other types of) communications.

In this regard, in method 800, at Block 806, it can be determined whether to monitor for dynamic SFI. In an aspect, symbol direction component 252, e.g., in conjunction with processor(s) 212, memory 216, transceiver 202, communicating component 242, etc., can determine whether to monitor for dynamic SFI. For example, symbol direction component 252 can determine whether to monitor for dynamic SFI based at least in part on a configuration received from the base station 102 that may indicate to monitor for dynamic SFI.

In one example, the activation DCI, described in conjunction with Block 804, or other received DCI or other configuration may include a configuration or indication of whether to rely on dynamic SFI or not (or whether to rely on semi-static SFI or not) for determining a symbol direction, as described herein. In one example, symbol direction component 252 can determine whether to rely on dynamic SFI or not based on this configuration or indication. In an example, the configuration or indication (e.g., in the activation DCI) may include a bit value indicating whether to rely on dynamic SFI or not, or a bit value indicating whether to rely on semi-static SFI or not, or a bit value indicating to rely on dynamic SFI or to rely on semi-static SFI, etc. For example, symbol direction component 252 can determine whether to rely on dynamic SFI based on the configuration or indication and/or based on the additional considerations described below, which may include ignoring the dynamic SFI (e.g., even if configured to rely the dynamic SFI) due to its low priority, as described herein. For example, symbol direction component 252 can determine to rely on dynamic SFI (e.g., and as such may monitor a DCI format, such as DCI format 2_0 as defined in 3GPP radio access technologies, from which the dynamic SFI can be obtained) or to rely on semi-static SFI (e.g., where the indicator indicates to ignore or otherwise not rely on the dynamic SFI).

Where it is determined to monitor for dynamic SFI, in method 800, optionally at Block 808, one or more repetitions of the uplink communication can be transmitted based on determining to monitor for dynamic SFI. In an aspect, communicating component 242, e.g., in conjunction with processor(s) 212, memory 216, transceiver 202, etc., can transmit, based on determining to monitor for dynamic SFI, the one or more repetitions of the uplink communication. For eMBB communications, for example, this can include transmitting over the symbols and/or segmenting at symbols indicated by the semi-static SFI as downlink, symbols indicated by the semi-static SFI as flexible and the dynamic SFI as downlink, symbols that cross a slot boundary, etc., as described above. In addition, in this regard, symbol mapping component 254 can map the repetitions to the symbols for transmitting in this regard.

In transmitting the one or more repetitions of the uplink communication at Block 808, optionally, at Block 810, where the uplink communication is URLLC, symbols indicated by the SFI as uplink can be transmitted over and symbols indicated by the SFI as downlink or flexible can be refrained from being transmitted over. In an aspect, communicating component 242, e.g., in conjunction with processor(s) 212, memory 216, transceiver 202, etc., can, where the uplink communication is URLLC, transmit over symbols indicated by the SFI as uplink and refrain from transmitting over symbols indicated by the SFI as downlink or flexible. In other words, for example, the UE 104 can ignore dynamic SFI due to its low priority and use semi-static U symbols (semi-statically configured uplink symbols), such that a nominal repetition can be segmented if it goes across the slot boundary or there is a semi-static D or X symbol within the set of symbols for the nominal repetition, as described above.

Figure 9:
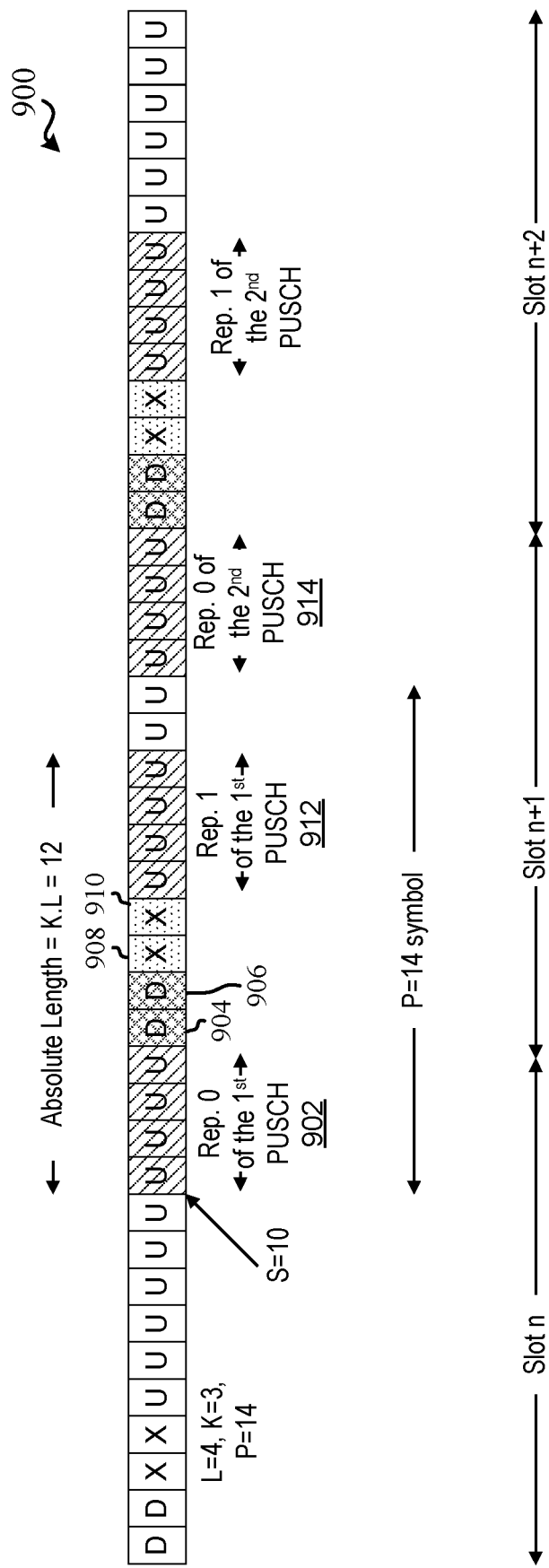
FIG. 9 illustrates an example of a slot configuration for transmitting one or more repetitions based on ignoring dynamic SFI, in accordance with various aspects of the present disclosure.

An example is illustrated in FIG. 9, which illustrates an example of a slot configuration 900 where the SFI can indicate symbols 902 as uplink, symbols 904, 906 as downlink, symbols 908, 910 as flexible, symbols 912 as uplink, symbols 914 as uplink, etc. In this example, symbol mapping component 254 can map a first repetition (e.g., first transmission) of the uplink transmission over the uplink symbols 902. In addition, symbol mapping component 254 can skip symbols 904, 906, 908, 910, configured as downlink or flexible in the SFI (and regardless of a dynamic SFI) and can map the repetition only over the uplink symbols 912, etc.

Where it is determined not to monitor for dynamic SFI, in method 800, optionally at Block 812, one or more repetitions of the uplink communication can be transmitted based on determining not to monitor for dynamic SFI. In an aspect, communicating component 242, e.g., in conjunction with processor(s) 212, memory 216, transceiver 202, etc., can transmit, based on determining not to monitor for dynamic SFI, the one or more repetitions of the uplink communication. For eMBB communications (or other communications with less restrictive latency and/or reliability requirements of another type of communications), for example, this can include transmitting over the symbols and/or segmenting at symbols indicated by the semi-static SFI as downlink, symbols indicated by the semi-static SFI as flexible and the dynamic SFI as downlink, symbols that cross a slot boundary, etc., as described above.

In transmitting the one or more repetitions of the uplink communication at Block 812, optionally, at Block 814, where the uplink communication is URLLC, symbols indicated by the SFI as uplink or flexible can be transmitted over and symbols indicated by the SFI as downlink can be refrained from being transmitted over. In an aspect, communicating component 242, e.g., in conjunction with processor(s) 212, memory 216, transceiver 202, etc., can, where the uplink communication is URLLC (e.g., determined to be URLLC or other type of communications with more restrictive latency and/or reliability requirements of another type of communications), transmit over symbols indicated by the SFI as uplink or flexible and refrain from transmitting over symbols indicated by the SFI as downlink. In other words, for example, the UE 104 can use semi-static X and U for UL transmission unless UE receives a dynamic grant indicating X as D, such that a nominal repetition can be segmented if it goes across the slot boundary or there is a semi-static D symbol within the set of symbols for the nominal repetition.

In either example, the base station 102 can receive the one or more repetitions from the UE 104 and may do so based on determining whether the UE 104 uses the symbol direction based on dynamic SFI or not and/or based on whether the uplink communications are for URLLC or eMBB (or between other types of communications having different reliability and/or latency requirements). In this regard, in method 700, at Block 706, it can be determined whether the symbol direction is based on transmitted dynamic SFI. In an aspect, decoding component 356, e.g., in conjunction with processor(s) 312, memory 316, transceiver 302, configuring component 342, etc., can determine whether the symbol direction (e.g., as determined by the UE 104 in mapping repetitions to symbols) is based on transmitted dynamic SFI. For example, decoding component 356 can determine whether the symbol direction is based on transmitted dynamic SFI at least in part by determining a type of the uplink communication (e.g., as being URLLC or eMBB), determining whether the UE 104 is configured to monitor for dynamic SFI, whether scheduling component 354 has transmitted dynamic SFI to the UE 104, and/or the like.

Where it is determined that the symbol direction is based on transmitted dynamic SFI at Block 706, optionally at Block 708, one or more repetitions of an uplink communication can be received based on the transmitted dynamic SFI. In an aspect, decoding component 356, e.g., in conjunction with processor(s) 312, memory 316, transceiver 302, configuring component 342, etc., can receive and/or decode, based on the transmitted dynamic SFI, the one or more repetitions of the uplink communication. For example decoding component 356 can determine to receive the one or more repetitions over symbols indicated as uplink in a semi-static SFI, symbols indicated as flexible in the semi-static SFI and as uplink in dynamic SFI, etc. for receiving the one or more repetitions. In addition, for example, decoding component 356 can consider the type of communication in determining whether to consider the dynamic SFI. For URLLC communications (or other communications with more restrictive latency and/or reliability requirements of another type of communications), for example, decoding component 356 can determine to ignore the dynamic SFI, as described.

In this example, in receiving the one or more repetitions at Block 708, optionally at Block 710, where the uplink communication is URLLC, symbols indicated by the SFI as uplink can be received over and symbols indicated by the SFI as downlink or flexible can be refrained from receiving over. In an aspect, decoding component 356, e.g., in conjunction with processor(s) 312, memory 316, transceiver 302, configuring component 342, etc., can, where the uplink communication is URLLC (e.g., determined to be URLLC or other communications with more restrictive latency and/ or reliability requirements of another type of communications), receive over symbols indicated by the SFI as uplink and refrain from receiving over symbols indicated by the SFI as downlink or flexible (e.g., regardless of the dynamic SFI).

Where it is determined that the symbol direction is not based on transmitted dynamic SFI at Block 706, optionally at Block 712, one or more repetitions of an uplink communication can be received based on the SFI. In an aspect, decoding component 356, e.g., in conjunction with processor(s) 312, memory 316, transceiver 302, configuring component 342, etc., can receive and/or decode, based on the SFI (e.g., which can be a semi-static SFI as transmitted in Block 702), the one or more repetitions of the uplink communication. For example decoding component 356 can determine to receive the one or more repetitions over symbols indicated as uplink or flexible in a semi-static SFI for receiving the one or more repetitions. At least for URLLC communications, for example, decoding component 356 can receive the one or more repetitions over symbols indicated as flexible as well, and the base station 102 can refrain from scheduling downlink communications over flexible symbols that are part of the resource grant for the UE 104.

In this example, in receiving the one or more repetitions at Block 712, optionally at Block 714, where the uplink communication is URLLC, symbols indicated by the SFI as uplink or flexible can be received over and symbols indicated by the SFI as downlink can be refrained from receiving over. In an aspect, decoding component 356, e.g., in conjunction with processor(s) 312, memory 316, transceiver 302, configuring component 342, etc., can, where the uplink communication is URLLC (e.g., determined to be URLLC or other communications with more restrictive latency and/ or reliability requirements of another type of communications), receive over symbols indicated by the SFI as uplink or flexible and refrain from receiving over symbols indicated by the SFI as downlink.

In one example, method 700 and/or 800 may be applied for type 1 CG and type 2 CG other than a first PUSCH transmission (and corresponding repetitions) in type 2 CG. For Type 2 CG PUSCH transmission, for the first PUSCH transmission activated by activation DCI, and associated repetition(s), mechanisms described above (e.g., in methods 400 and/or 500) can be used as the activation DCI can carry the current flexible symbol information, whereas in RRC signaling associated with type 1 CG and type 2 CG, other than the first transmission, may not have current flexible symbol information (e.g., and the flexible symbols can change communication direction over time).

Figure 10:
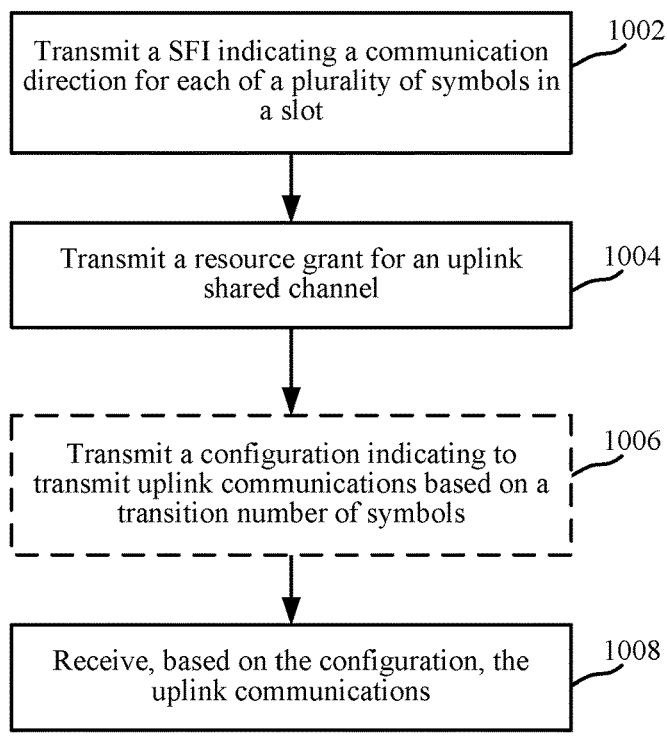
FIG. 10 is a flow chart illustrating an example of a method for receiving one or more repetitions based on a transition number of symbols, in accordance with various aspects of the present disclosure.
Figure 11:
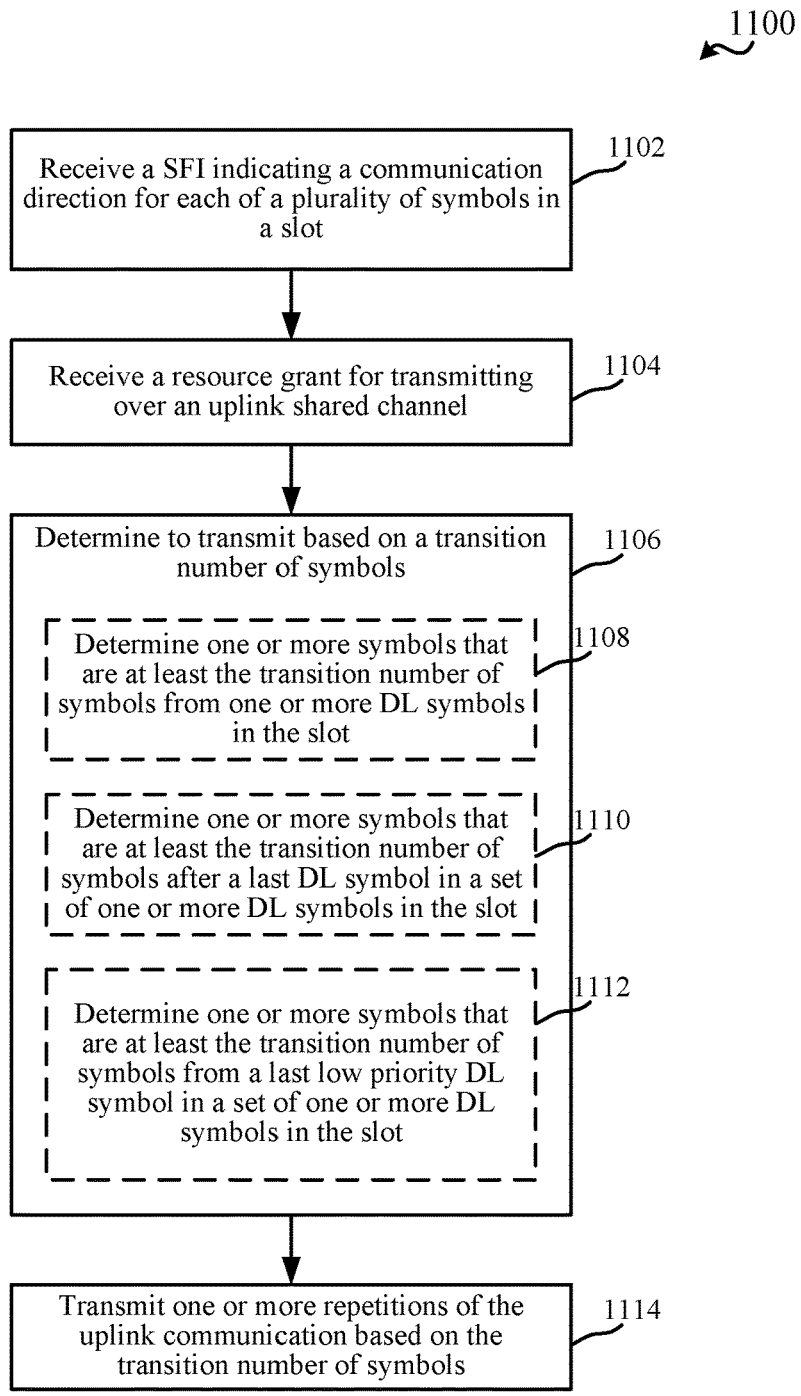
FIG. 11 is a flow chart illustrating an example of a method for transmitting one or more repetitions based on a transition number of symbols, in accordance with various aspects of the present disclosure.

FIG. 10 illustrates a flow chart of an example of a method 1000 for receiving uplink communications based on a transition number of symbols in accordance with aspects described herein. FIG. 11 illustrates a flow chart of an example of a method 1100 for transmitting uplink communications based on a number of transition symbols in accordance with aspects described herein. Method 1000 and 1100 are described in conjunction with one another for ease of explanation, though the methods 1000 and 1100 are not required to be performed in conjunction. In one example, a base station 102 can perform the functions described in method 1000 using one or more of the components described in FIGS. 1 and 3, and a UE 104 can perform the functions described in method 1100 using one or more of the components described in FIGS. 1 and 2.

In method 1000, at Block 1002, a SFI indicating a communication direction for each of a plurality of symbols in a slot can be transmitted. In an aspect, slot format component 352, e.g., in conjunction with processor(s) 312, memory 316, transceiver 302, configuring component 342, etc., can transmit the SFI indicating the communication direction for each of the plurality of symbols in the slot, as described above in connection with Block 402 of method 400.

In method 1100, at Block 1102, a SFI indicating a communication direction for each of a plurality of symbols in a slot can be determined. In an aspect, symbol direction component 252, e.g., in conjunction with processor(s) 212, memory 216, transceiver 202, communicating component 242, etc., can determine the SFI indicating the communication direction for each of the plurality of symbols in the slot, as described above in connection with Block 502 of method 500.

In method 1000, at Block 1004, a resource grant can be transmitted for an uplink shared channel. In an aspect, scheduling component 354, e.g., in conjunction with processor(s) 312, memory 316, transceiver 302, configuring component 342, etc., can transmit the resource grant for the uplink shared channel (e.g., PUSCH), as described above in connection with Block 404 of method 400, but where the resource grant may or may not include the flexible symbol indicator.

In method 1100, at Block 1104, a resource grant for transmitting over an uplink shared channel can be received. In an aspect, communicating component 242, e.g., in conjunction with processor(s) 212, memory 216, transceiver 202, etc., can receive the resource grant for transmitting over the uplink shared channel, as described above in connection with Block 504 of method 500, but where the resource grant may or may not include the flexible symbol indicator.

In method 1000, optionally at Block 1006, a configuration indicating to transmit uplink communications based on a transition number of symbols can be transmitted. In an aspect, scheduling component 354, e.g., in conjunction with processor(s) 312, memory 316, transceiver 302, configuring component 342, etc., can transmit the configuration indicating to transmit uplink communications based on a transition number of symbols. For example, scheduling component 354 can transmit the configuration to include an indication of the transition number of symbols, to include an indication to consider the transition number of symbols in determining symbols over which to map uplink communications or related repetitions, to include an indication of a symbol from which to skip symbols as transition number of symbols, etc. In one example, the transition number of symbols can correspond to a number of consecutive symbols considered to allow enough time for the UE 104 to switch its transceiver from receiving downlink communications to transmitting uplink communications, for applying and/or using an timing advance, which can be separately configured by the base station 102, and/or the like. For example, scheduling component 354 can transmit the configuration using RRC signaling, DCI, etc.

In method 1100, at Block 1106, it can be determined to transmit based on a transition number of symbols. In an aspect, symbol mapping component 254, e.g., in conjunction with processor(s) 212, memory 216, transceiver 202, communicating component 242, etc., can determine to transmit based on the transition number of symbols. For example, symbol mapping component 254 can determine to skip one or more symbols indicated in a resource grant to allow for transitioning from downlink to uplink communications, for applying a timing advance, etc. Various mechanisms and considerations can be used to allow for the transition number of symbols. In one example, symbol mapping component 254 can determine to transmit based on the transition number of symbols based on receiving a configuration from the base station 102 (e.g., in RRC signaling, DCI, etc.), as described above, or otherwise. For example, the configuration may indicate parameters to facilitate the various determinations described below.

In an example, uplink frame number i for transmission from a UE can start T_TA (e.g., milliseconds) before the start of the corresponding downlink frame at the UE. A UE not capable of full-duplex communication may not be expected to transmit in the uplink earlier than $N_{Rx-Tx}T_c$ after the end of the last received downlink symbol in the same cell, where $N_{Rx-Tx}$ can be as defined in 3GPP technical specification (TS) 38.211, given in Table 4.3.2-3. In this regard, transition time in frequency range 1 (FR1) can be almost 13 microseconds (us) which is less than a symbol at 60 kHz subcarrier spacing (SCS). Transition time in frequency range 2 (FR2) can be almost 7 us which is less than a symbol at 120 kHz SCS. In an example, symbol mapping component 254 can determine time domain resources in time division duplexing (TDD), considering timing advance and/or transition times. For example, the UE can know how D symbols are defined (e.g., based on the received SFI, which may include semi-static SFI and/or dynamically indication e.g. through dynamic grant or dynamic SFI, which may be subject to one or more of the processes described above with reference to FIGS. 4, 5, 7, and 8).

M one example, the UE 104 may not expect to be scheduled in up to $X_D$ DL symbols for DL reception and/or monitoring. $X_D$, which can be the transition number of symbols, can be such that for its equivalent time domain $X_{Dt}$ for the given DL SCS, $X_{Dt} \geq [T\_TA+N_{Rx-Tx}T_c]$. Thus, for example, in determining to transmit based on the transition number of symbols at Block 1106, optionally at Block 1108, one or more symbols that are at least the transition number of symbols from one or more DL symbols in the slot can be determined. In an aspect, symbol mapping component 254, e.g., in conjunction with processor(s) 212, memory 216, transceiver 202, communicating component 242, etc., can determine the one or more symbols that are at least the transition number of symbols from the one or more DL symbols in the slot.

Figure 12A:
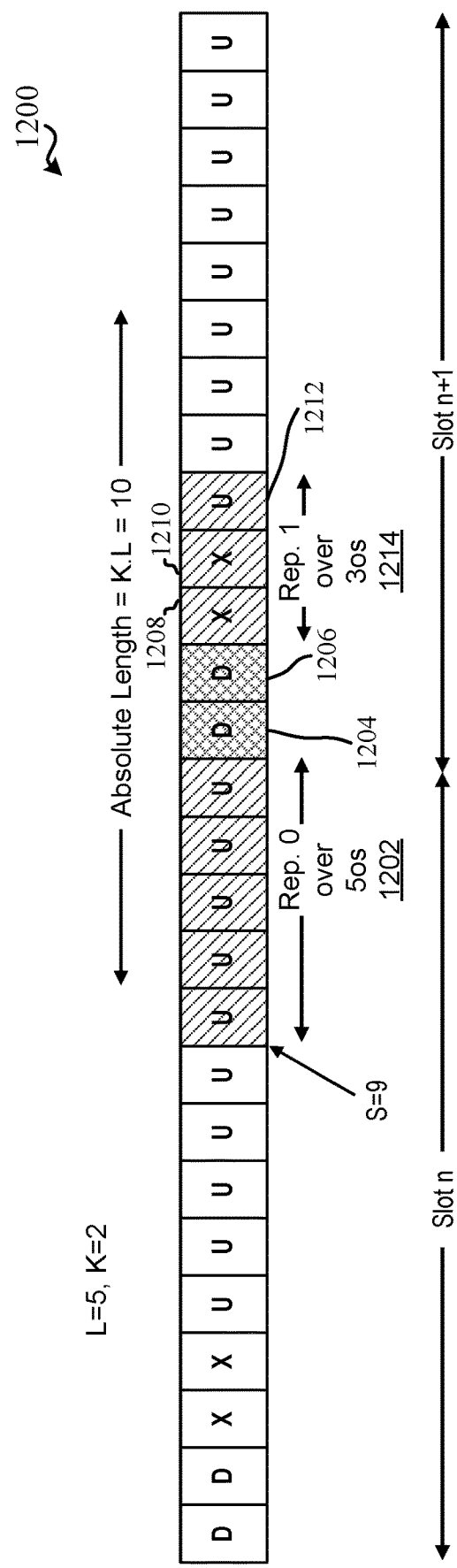
FIGS. 12a-c illustrate examples of slot configurations for transmitting one or more repetitions based on determining a transition number of symbols, in accordance with various aspects of the present disclosure.

An example is illustrated in FIG. 12a, which illustrates an example of a slot configuration 1200 where the SFI can indicate symbols 1202 as uplink, symbols 1204, 1206 as downlink, symbols 1208, 1210 as flexible, symbol 1212 as uplink, etc. In this example, symbol mapping component 254 can map a first repetition (e.g., first transmission) of the uplink transmission over the uplink symbols 1202. In addition, symbol mapping component 254 can skip symbols 1204, 1206, configured as downlink in the SFI. In this example, where the transition number of symbols=2, symbol mapping component 254 can determine the transition symbols as the two DL symbols starting from DL symbol 1204, and can assume that the base station 102 does not schedule the UE 104 to receive downlink communications in these DL symbols 1204, 1206, such to allow two symbols for the UE 104 to transition to uplink communications by the flexible symbol 1208. Based on this assumption and on determining to skip DL symbols 1204, 1206, symbol mapping component 254 can map the repetition over symbols 1214.

In another example, the UE 104 may assume up to $X_U$ symbols between the last D symbol and the first eligible symbol for UL transmission. $X_U$, which can be the number of transition symbols, can be such that for its equivalent time domain $X_{Ut}$ for the given UL SCS, $X_{Ut} \geq \lceil T\_TA + N_{Rx-Tx} T_c \rceil$. Thus, for example, in determining to transmit based on the transition number of symbols at Block 1106, optionally at Block 1110, one or more symbols that are at least the transition number of symbols after a last DL symbol in a set of one or more DL symbols in the slot can be determined. In an aspect, symbol mapping component 254, e.g., in conjunction with processor(s) 212, memory 216, transceiver 202, communicating component 242, etc., can determine the one or more symbols that are at least the transition number of symbols after the last DL symbol in a set of symbols from the one or more DL symbols in the slot.

Figure 12B:
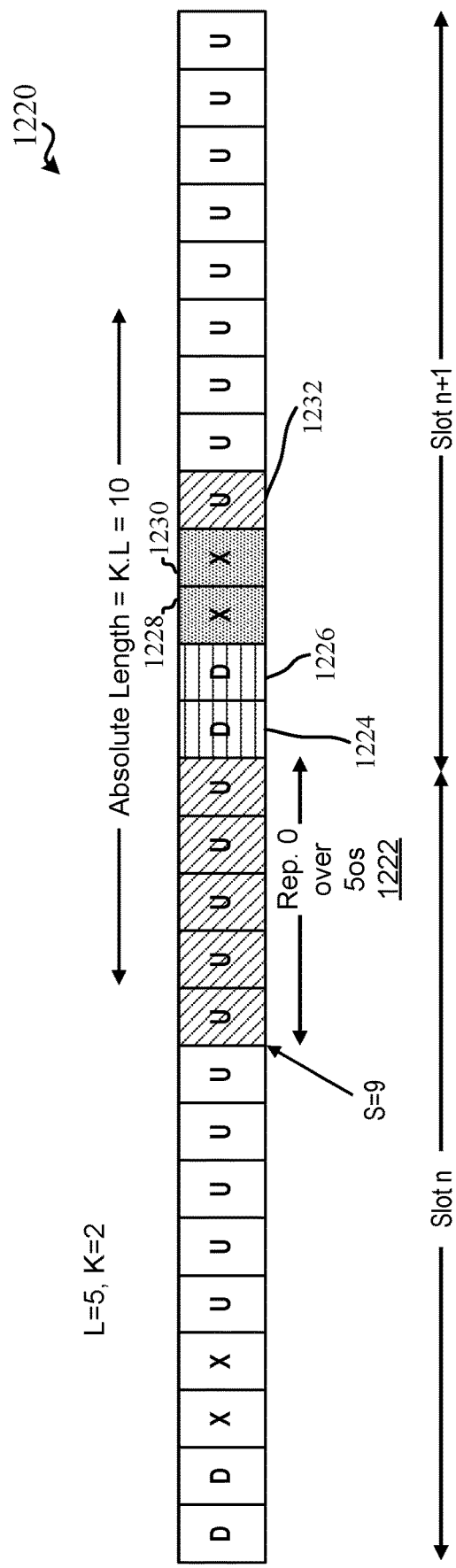

An example is illustrated in FIG. 12b, which illustrates an example of a slot configuration 1220 where the SFI can indicate symbols 1222 as uplink, symbols 1224, 1226 as downlink, symbols 1228, 1230 as flexible, symbol 1232 as uplink, etc. In this example, symbol mapping component 254 can map a first repetition (e.g., first transmission) of the uplink transmission over the uplink symbols 1222. In addition, symbol mapping component 254 can skip symbols 1224, 1226, configured as downlink in the SFI. In this example, where the transition number of symbols=2, symbol mapping component 254 can determine the transition symbols as the two flexible symbols 1228, 1230 that are after the last DL symbol 1226, and can assume that the base station 102 does not schedule the UE 104 to receive downlink communications in these flexible symbols 1228, 1230, such to allow two symbols for the UE 104 to transition to uplink communications by the uplink symbol 1232. Based on this assumption, symbol mapping component 254 can map the repetition over symbol 1232.

In another example, the UE 104 can be indicated (e.g., via configuration from the base station 102, as described above, or otherwise) to apply one or more of the above examples. The indication can be explicit, e.g. through DCI or RRC configuration, or implicit, e.g. UE can assume to determine the transition number of symbols after a last DL symbol if UE is scheduled/configured to receive high priority DL reception in the last $X_D$ symbols. In another example, the UE 104 can determine the transition number of symbols based on the last $\min(X_D, D_{LP})$ symbols, where $D_{LP}$ can represent D symbols before eligible UL transmission that UE is not scheduled/configured to receive high priority DL receptions.

In this example, the UE 104 can then also determine the transition number of symbols after a last downlink symbol. Thus, for example, in determining to transmit based on the transition number of symbols at Block 1106, optionally at Block 1112, one or more symbols that are at least the transition number of symbols from a last low priority DL symbol in a set of one or more DL symbols in the slot can be determined. In an aspect, symbol mapping component 254, e.g., in conjunction with processor(s) 212, memory 216, transceiver 202, communicating component 242, etc., can determine the one or more symbols that are at least the transition number of symbols from a last low priority DL symbol in a set of symbols from the one or more DL symbols in the slot.

Figure 12C:
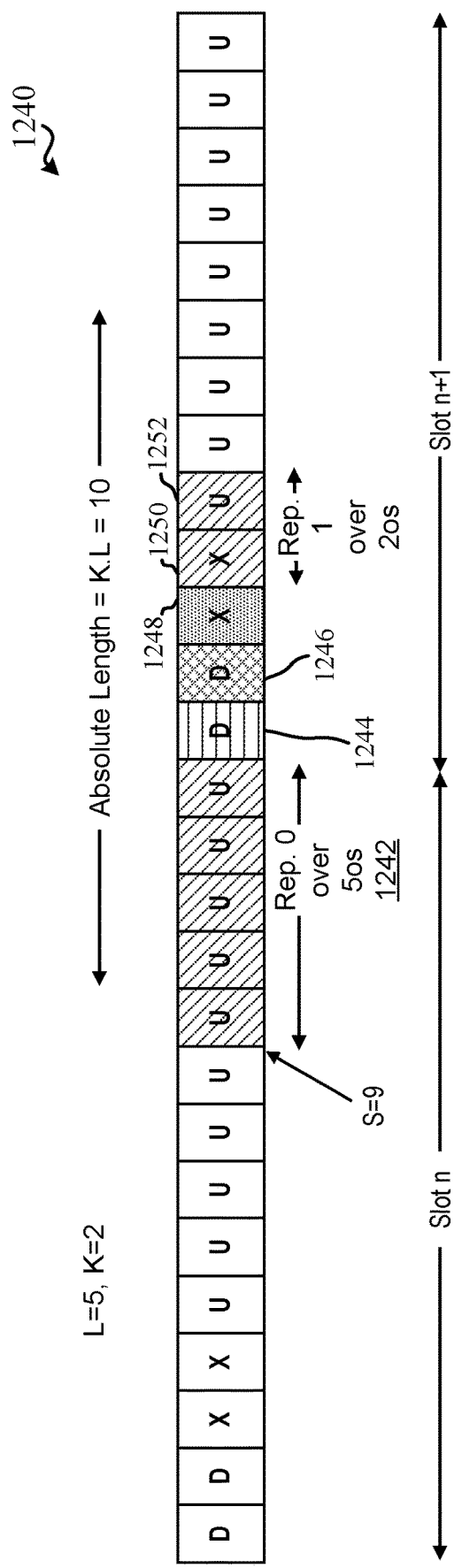

An example is illustrated in FIG. 12c, which illustrates an example of a slot configuration 1240 where the SFI can indicate symbols 1242 as uplink, symbols 1244, 1246 as downlink, symbols 1248, 1250 as flexible, symbol 1252 as uplink, etc. In this example, symbol mapping component 254 can map a first repetition (e.g., first transmission) of the uplink transmission over the uplink symbols 1242. The base station 102 can schedule high priority DL in symbol 1244 and low priority downlink in symbol 1246. Thus, symbol mapping component 254 can consider the low priority DL symbol 1246 to be in the transition number of symbols. In this example, where the transition number of symbols=2, symbol mapping component 254 can determine the transition symbols as the low priority DL symbol 1246 and the first flexible symbol 1248. Accordingly, symbol mapping component 254 can map the repetition over flexible symbol 1250 and uplink symbol 1252.

Alternatively, in an example, a UE 104 may be initially scheduled/configured for DL reception in those $X_D$ symbols (e.g., via SFI), but the base station 102 can preempt this case, as described with reference to FIG. 13 below.

In method 1100, optionally at Block 1114, one or more repetitions of the uplink communication can be transmitted based on the transition number of symbols. In an aspect, communicating component 242, e.g., in conjunction with processor(s) 212, memory 216, transceiver 202, etc., can transmit the one or more repetitions of the uplink communication based on the transition number of symbols. For example, symbol mapping component 254 can map the one or more repetitions onto the symbols based on the transition number of symbols, as described in the various examples above.

In method 1000, at Block 1008, one or more repetitions of an uplink communication can be received based on the configuration. In an aspect, decoding component 356, e.g., in conjunction with processor(s) 312, memory 316, transceiver 302, configuring component 342, etc., can receive and/or decode, based on the configuration (e.g., the configuration that indicates to transmit uplink communications based on the transition number of symbols), one or more repetitions of the uplink communication. For example, decoding component 356 can determine one or more symbols to which the uplink communication is to be mapped based on the SFI and/or the transition number of symbols, as described above, and can accordingly receive and/or decode the uplink communication from the one or more symbols.

Figure 13:
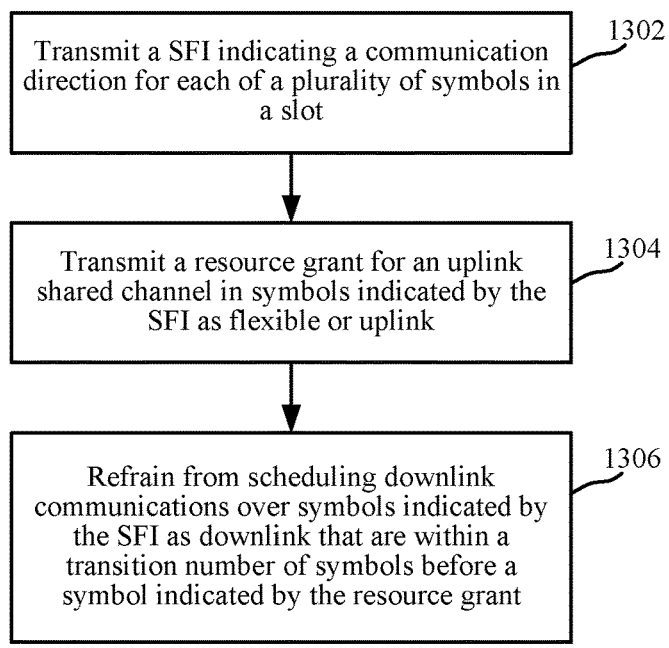
FIG. 13 is a flow chart illustrating an example of a method for refraining from scheduling downlink symbols within an indicated uplink resource grant, in accordance with various aspects of the present disclosure.

FIG. 13 illustrates a flow chart of an example of a method 1300 for receiving uplink communications based on a transition number of symbols in accordance with aspects described herein. In one example, a base station 102 can perform the functions described in method 1300 using one or more of the components described in FIGS. 1 and 3.

In method 1300, at Block 1302, a SFI indicating a communication direction for each of a plurality of symbols in a slot can be transmitted. In an aspect, slot format component 352, e.g., in conjunction with processor(s) 312, memory 316, transceiver 302, configuring component 342, etc., can transmit the SFI indicating the communication direction for each of the plurality of symbols in the slot, as described above in connection with Block 402 of method 400.

In method 1300, at Block 1304, a resource grant can be transmitted for an uplink shared channel in symbols indicated by the SFI as flexible or uplink. In an aspect, scheduling component 354, e.g., in conjunction with processor(s) 312, memory 316, transceiver 302, configuring component 342, etc., can transmit the resource grant for the uplink shared channel (e.g., PUSCH) in symbols indicated by the SFI as flexible or uplink, as described above in connection with Block 404 of method 400, but where the resource grant may or may not include the flexible symbol indicator.

In method 1300, at Block 1306, scheduling downlink communications over symbols indicated by the SFI as downlink that are within a transition number of symbols before a symbol indicated by the resource grant may be refrained from. In an aspect, scheduling component 354, e.g., in conjunction with processor(s) 312, memory 316, transceiver 302, configuring component 342, etc., can refrain from scheduling downlink communications over symbols indicated by the SFI as downlink that are within a transition number of symbols before a symbol indicated by the resource grant. This can allow the UE 104 to use these symbols in waiting the transition number of symbols before mapping/transmitting repetitions over the symbols.

Figure 14:
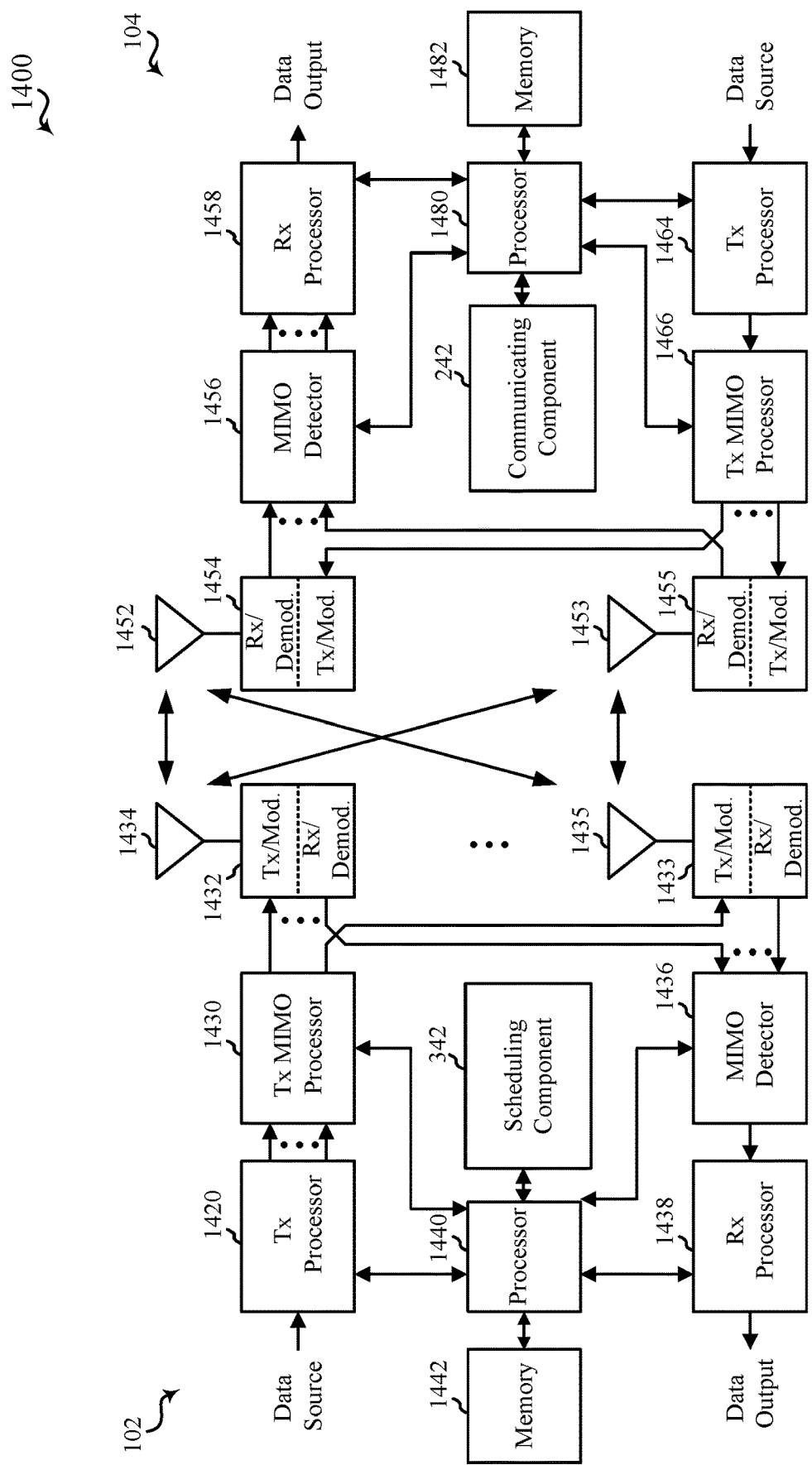
FIG. 14 is a block diagram illustrating an example of a MIMO communication system including a base station and a UE, in accordance with various aspects of the present disclosure.

FIG. 14 is a block diagram of a MIMO communication system 1400 including a base station 102 and a UE 104. The MIMO communication system 1400 may illustrate aspects of the wireless communication access network 100 described with reference to FIG. 1. The base station 102 may be an example of aspects of the base station 102 described with reference to FIG. 1. The base station 102 may be equipped with antennas 1434 and 1435, and the UE 104 may be equipped with antennas 1452 and 1453. In the MIMO communication system 1400, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1420 may receive data from a data source. The transmit processor 1420 may process the data. The transmit processor 1420 may also generate control symbols or reference symbols. A transmit MIMO processor 1430 may perform spatial processing (e.g., precoding) on data symbols, control symbols, or reference symbols, if applicable, and may provide output symbol streams to the transmit modulator/demodulators 1432 and 1433. Each modulator/demodulator 1432 through 1433 may process a respective output symbol stream (e.g., for OFDM, etc.) to obtain an output sample stream. Each modulator/demodulator 1432 through 1433 may further process (e.g., convert to analog, amplify, filter, and upconvert) the output sample stream to obtain a DL signal. In one example, DL signals from modulator/demodulators 1432 and 1433 may be transmitted via the antennas 1434 and 1435, respectively.

The UE 104 may be an example of aspects of the UEs 104 described with reference to FIGS. 1-2. At the UE 104, the UE antennas 1452 and 1453 may receive the DL signals from the base station 102 and may provide the received signals to the modulator/demodulators 1454 and 1455, respectively. Each modulator/demodulator 1454 through 1455 may condition (e.g., filter, amplify, downconvert, and digitize) a respective received signal to obtain input samples. Each modulator/demodulator 1454 through 1455 may further process the input samples (e.g., for OFDM, etc.) to obtain received symbols. A MIMO detector 1456 may obtain received symbols from the modulator/demodulators 1454 and 1455, perform MIMO detection on the received symbols, if applicable, and provide detected symbols. A receive (Rx) processor 1458 may process (e.g., demodulate, deinterleave, and decode) the detected symbols, providing decoded data for the UE 104 to a data output, and provide decoded control information to a processor 1480, or memory 1482.

The processor 1480 may in some cases execute stored instructions to instantiate a communicating component 242 (see e.g., FIGS. 1 and 2).

On the uplink (UL), at the UE 104, a transmit processor 1464 may receive and process data from a data source. The transmit processor 1464 may also generate reference symbols for a reference signal. The symbols from the transmit processor 1464 may be precoded by a transmit MIMO processor 1466 if applicable, further processed by the modulator/demodulators 1454 and 1455 (e.g., for SC-FDMA, etc.), and be transmitted to the base station 102 in accordance with the communication parameters received from the base station 102. At the base station 102, the UL signals from the UE 104 may be received by the antennas 1434 and 1435, processed by the modulator/demodulators 1432 and 1433, detected by a MIMO detector 1436 if applicable, and further processed by a receive processor 1438. The receive processor 1438 may provide decoded data to a data output and to the processor 1440 or memory 1442.

The processor 1440 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 1400. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1400.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication, comprising:
determining a slot format indicator (SFI) indicating a communication direction for each of a plurality of symbols in a slot as being uplink, downlink, or flexible;
receiving a resource grant for transmitting over an uplink shared channel, wherein the resource grant indicates an index of a starting symbol for transmitting an uplink communication, a number of symbols for transmitting the uplink communication, and a nominal number of repetitions for transmitting the uplink communication;
determining whether the resource grant includes an indicator indicating whether symbols in the slot indicated by the SFI as flexible can be used for uplink communications; and
transmitting, based at least in part on the indicator, one or more repetitions of the uplink communication starting at the starting symbol, continuing over the number of symbols, and based on the nominal number of repetitions.

2. The method of example 1, wherein the indicator is a bitmap having a bit for each group of one or more symbols indicated by the SFI as flexible, wherein each bit indicates whether the group of one or more symbols can be used for uplink communications.

3. The method of example 2, wherein the bitmap has a bit for each group of one or more symbols, after a first uplink transmission, that are indicated by the SFI as flexible.

4. The method of any of examples 2 or 3, wherein the bitmap has a bit for each group of one or more symbols, starting from the starting symbol, that are indicated by the SFI as flexible.

5. The method of any of examples 2 to 4, wherein the bitmap has a bit for each group of one or more symbols, after or starting at a first uplink transmission and excluding at least one of a number of transition symbols used for transitioning from downlink to uplink and/or for applying a timing advance, a number of synchronization symbols used to indicate reception of synchronization signal blocks, or a number of control symbols used to indicate reception of a control resource set, that are indicated by the SFI as flexible.

6. The method of any of examples 1 to 5, wherein at least one of determining whether the resource grant includes the indicator or transmitting based at least in part on the indicator is based at least in part on determining a traffic type of the uplink communication as ultra-reliable low-latency communication (URLLC).

7. The method of any of examples 1 to 6, further comprising transmitting, based on determining that the resource grant does not include the indicator and where the resource grant is for using ultra-reliable low-latency communication (URLLC), the one or more repetitions of the uplink communications starting at the starting symbol, continuing over the number of symbols, and based on the nominal number of repetitions.

8. The method of any of examples 1 to 7, further comprising receiving, based on determining that the resource grant does not include the indicator and where the resource grant is for using enhanced mobile broadband (eMBB), a dynamic SFI indicating whether the symbols in the slot indicated by the SFI as flexible can be used for uplink communications, and wherein transmitting the one or more repetitions of the uplink communications is based at least in part on the dynamic SFI.

9. The method of claim 8, wherein transmitting the one or more repetitions of the uplink communications based on the dynamic SFI is further based at least in part on a received configuration that indicates to rely on the dynamic SFI.

10. The method of any of examples 1 to 9, further comprising receiving, after the resource grant including the indicator, another downlink control information (DCI) for enhanced mobile broadband (eMBB) indicating the symbols in the slot indicated by the SFI as flexible are for downlink communications, and ignoring the another DCI for eMBB such that transmitting the one or more repetitions of the uplink communications is based at least in part on the resource grant including the indicator.

11. The method of any of examples 1 to 10, further comprising receiving, before the resource grant, another downlink control information (DCI) for enhanced mobile broadband (eMBB) indicating the symbols in the slot indicated by the SFI as flexible are for downlink communications, and overriding the DCI for eMBB with the indicator such that transmitting the one or more repetitions of the uplink communications is based at least in part on the resource grant including the indicator.

12. The method of any of examples 1 to 11, further comprising receiving, after the resource grant including the indicator, another downlink control information (DCI) for enhanced mobile broadband (eMBB) indicating the symbols in the slot indicated by the SFI as flexible are for downlink communications, and, based on at least one of a UE capability, the resource grant or the another DCI for eMBB being in different bandwidth parts, or based on a configuration for frequency division duplexing, using the another DCI for eMBB such that transmitting the one or more repetitions of the uplink communications is based at least in part on the another DCI for eMBB.

13. The method of any of examples 1 to 12, wherein transmitting the one or more repetitions of the uplink communications is based at least in part on applying the indicator within a bandwidth part of the uplink communications.

14. The method of any of examples 1 to 13, wherein the SFI is a semi-static SFI.

15. The method of any of examples 1 to 14, wherein the resource grant is a dynamic downlink control information (DCI) resource grant.

16. The method of any of examples 1 to 15, wherein the resource grant is an activation DCI resource grant for type 2 uplink configured grant, and wherein the uplink communication is a first uplink communication corresponding to the resource grant.

17. A method for wireless communication, comprising:
determining a slot format indicator (SFI) indicating a communication direction for each of a plurality of symbols in a slot as being uplink, downlink, or flexible;
receiving a resource grant for transmitting over an uplink shared channel, wherein the resource grant indicates an index of a starting symbol for transmitting an uplink communication, a number of symbols for transmitting the uplink communication, and a nominal number of repetitions for transmitting the uplink communication; and
transmitting, based on determining whether to monitor for dynamic SFI, one or more repetitions of the uplink communication starting at the starting symbol, continuing over the number of symbols, and based on the nominal number of repetitions.

18. The method of example 17, further comprising receiving, based on determining to rely on dynamic SFI and where the resource grant is for using ultra-reliable low-latency communication (URLLC), a dynamic SFI, wherein the SFI is a semi-static SFI, and wherein transmitting the one or more repetitions of the uplink communications comprises transmitting over symbols indicated by the semi-static SFI as uplink.

19. The method of example 18, wherein transmitting the one or more repetitions comprises segmenting at least one repetition of the one or more repetition over non-consecutive symbols where consecutive symbols determined for the at least one repetition cross a slot boundary or cross symbols indicated by the semi-static SFI as downlink or flexible.

20. The method of any of examples 17 to 18, further comprising receiving a configuration indicating to rely on dynamic SFI, wherein determining to rely on dynamic SFI is based at least in part on the configuration.

21. The method of example 20, wherein receiving the configuration comprises receiving the configuration in an activation downlink control information (DCI) for a configured grant.

22. The method of any of examples 17 to 21, wherein the SFI is a semi-static SFI, and wherein transmitting the one or more repetitions of the uplink communications comprises transmitting, based on determining not to rely on dynamic SFI and where the resource grant is for using ultra-reliable low-latency communication (URLLC), over symbols indicated by the semi-static SFI as uplink or flexible.

23. The method of example 22, wherein transmitting over symbols indicated by the semi-static SFI as uplink or flexible is further based at least in part on determining that the symbols indicated by the semi-static SFI as flexible are not indicated as downlink in the resource grant.

24. The method of any of examples 17 to 23, wherein transmitting the one or more repetitions comprises segmenting at least one repetition of the one or more repetition over non-consecutive symbols where consecutive symbols determined for the at least one repetition cross a slot boundary or cross symbols indicated by the semi-static SFI or the resource grant as downlink.

25. The method of any of examples 17 to 22, further comprising receiving a configuration indicating to rely on semi-static SFI, wherein determining not to rely on dynamic SFI is based at least in part on the configuration.

26. The method of example 25, wherein receiving the configuration comprises receiving the configuration in an activation downlink control information (DCI) for a configured grant.

27. The method of any of examples 17 to 26, wherein transmitting the one or more repetitions of the uplink communications is based at least in part on determining that the resource grant is a type 1 configured grant or based at least in part on determining that the resource grant is a type 2 configured grant and that the one or more repetitions are subsequent to a first transmission.

28. A method for wireless communication, comprising:
receiving a slot format indicator (SFI) indicating a communication direction for each of a plurality of symbols in a slot as being uplink, downlink, or flexible;
receiving a resource grant for transmitting over an uplink shared channel, wherein the resource grant indicates an index of a starting symbol for transmitting an uplink communication, a number of symbols for transmitting the uplink communication, and a nominal number of repetitions for transmitting the uplink communication;
determining whether to transmit over one or more symbols indicated by the SFI as flexible or uplink based at least in part on a transition number of symbols defined for transitioning communication resources from receiving communications to transmitting communications; and
transmitting, based at least in part on the determination of whether to transmit over the one or more symbols indicated by the SFI as flexible or uplink, one or more repetitions of the uplink communication starting at the starting symbol, continuing over the number of symbols, and based on the nominal number of repetitions.

29. The method of example 28, wherein determining whether to transmit over the one or more symbols indicated by the SFI as flexible or uplink is based at least in part on determining the one or more symbols that are at least the transition number of symbols from one or more downlink symbols in the slot indicated by the SFI as downlink.

30. The method of any of examples 28 or 29, wherein determining whether to transmit over the one or more symbols indicated by the SFI as flexible or uplink is based at least in part on determining the one or more symbols that are at least the transition number of symbols after a last downlink symbol in a set of one or more downlink symbols in the slot indicated by the SFI as downlink.

31. The method of any of examples 28 to 30, further comprising receiving a configuration to receive downlink communications over a set of one or more symbols indicated by the SFI as downlink, wherein determining whether to transmit over the one or more symbols indicated by the SFI as flexible or uplink is based at least in part on the indication.

32. The method of any of examples 28 to 31, wherein determining whether to transmit over the one or more symbols indicated by the SFI as flexible or uplink is based at least in part on determining the one or more symbols that are at least the transition number of symbols from a last low priority downlink symbol in a set of one or more downlink symbols.

33. A method for wireless communication, comprising:
transmitting a slot format indicator (SFI) indicating a communication direction for each of a plurality of symbols in a slot as being uplink, downlink, or flexible;
transmitting a resource grant for an uplink shared channel, wherein the resource grant indicates an index of a starting symbol for transmitting an uplink communication, a number of symbols for transmitting the uplink communication, a nominal number of repetitions for transmitting the uplink communication, and an indicator indicating whether symbols in the slot indicated by the SFI as flexible can be used for uplink communications; and
receiving, based at least in part on the indicator, one or more repetitions of the uplink communication starting at the starting symbol, continuing over the number of symbols, and based on the nominal number of repetitions.

34. The method of example 33, wherein the indicator is a bitmap having a bit for each group of one or more symbols indicated by the SFI as flexible, wherein each bit indicates whether the group of one or more symbols can be used for uplink communications.

35. The method of example 34, wherein the bitmap has a bit for each group of one or more symbols after a first uplink transmission that are indicated by the SFI as flexible.

36. The method of any of examples 34 or 35, wherein the bitmap has a bit for each group of one or more symbols, starting from the starting symbol, that are indicated by the SFI as flexible.

37. The method of any of examples 34 to 36, wherein the bitmap has a bit for each group of one or more symbols, after or starting at a first uplink transmission and excluding at least one of a number of transition symbols used for transitioning from downlink to uplink and/or for applying a timing advance, a number of synchronization symbols used to indicate reception of synchronization signal blocks, or a number of control symbols used to indicate reception of a control resource set, that are indicated by the SFI as flexible.

38. The method of any of examples 34 to 37, further comprising transmitting a configuration specifying whether the resource grant includes the indicator.

39. The method of any of examples 34 to 38, wherein the SFI is a semi-static SFI.

40. The method of any of examples 34 to 39, wherein the resource grant is a dynamic downlink control information (DCI) resource grant.

41. The method of any of examples 34 to 40, wherein the resource grant is an activation DCI resource grant for type 2 uplink configured grant, and wherein the uplink communication is a first uplink communication corresponding to the resource grant.

42. A method for wireless communication, comprising:
transmitting a slot format indicator (SFI) indicating a communication direction for each of a plurality of symbols in a slot as being uplink, downlink, or flexible;
transmitting a resource grant for an uplink shared channel, wherein the resource grant indicates an index of a starting symbol for transmitting an uplink communication, a number of symbols for transmitting the uplink communication, and a nominal number of repetitions for transmitting the uplink communication;
determining, based at least in part on whether the resource grant is for ultra-reliable low-latency communication (URLLC) or enhanced mobile broadband (eMBB) communications, whether a communication direction of the number of symbols is based on a transmitted dynamic SFI; and
receiving, based at least in part on determining whether the communication direction of the symbols is based on the transmitted dynamic SFI, one or more repetitions of the uplink communication starting at the starting symbol, continuing over the number of symbols, and based on the nominal number of repetitions.

43. The method of example 42, wherein determining whether the communication direction of the symbols is based on the transmitted dynamic SFI is based on transmitting a configuration indicating whether the communication direction of the symbols is to be based on dynamic SFI.

44. The method of any of examples 42 or 43, wherein the SFI is a semi-static SFI, wherein receiving the one or more repetitions comprises, where the resource grant is for URLLC communications and based on determining that monitoring for dynamic SFI is configured, receiving over one or more symbols indicated by the semi-static SFI as uplink and refraining from receiving over one or more symbols indicated by the semi-static SFI as downlink or flexible regardless of the dynamic SFI.

45. The method of any of examples 42 to 44, wherein the SFI is a semi-static SFI, wherein receiving the one or more repetitions comprises, where the resource grant is for URLLC communications and based on determining that monitoring for dynamic SFI is not configured, receiving over one or more symbols indicated by the semi-static SFI as uplink or flexible and refraining from receiving over one or more symbols indicated by the semi-static SFI as downlink.

46. A method for wireless communication, comprising:
transmitting, to a user equipment (UE), a slot format indicator (SFI) indicating a communication direction for each of a plurality of symbols in a slot as being uplink, downlink, or flexible;
transmitting, to the UE, a resource grant for an uplink shared channel in symbols indicated by the SFI as flexible or uplink; and
refraining from scheduling downlink communications for the UE over symbols indicated by the SFI as downlink that are within a transition number of symbols before a symbol indicated by the resource grant.

47. A method for wireless communication, comprising:
transmitting, to a user equipment (UE), a slot format indicator (SFI) indicating a communication direction for each of a plurality of symbols in a slot as being uplink, downlink, or flexible;
transmitting, to the UE, a configuration indicating to transmit uplink communications at least one of at least a transition number of symbols from one or more downlink symbols in the slot indicated by the SFI as downlink, or at least the transition number of symbols after a last downlink symbol in a set of one or more downlink symbols in the slot indicated by the SFI as downlink; and
receiving, from the UE and based on the configuration, the uplink communications.

48. The method of example 47, wherein transmitting the configuration comprises transmitting, to the UE, downlink control information (DCI) or radio resource control (RRC) signaling that includes the configuration.

49. An apparatus for wireless communication, comprising:
a transceiver;
a memory configured to store instructions; and
one or more processors communicatively coupled with the transceiver and the memory, wherein the one or more processors are configured to execute the instructions to perform the operations of one or more methods in examples 1-48.

50. An apparatus for wireless communication, comprising means for performing the operations of one or more methods in examples 1-48.

51. A computer-readable medium, comprising code executable by one or more processors to perform the operations of one or more methods in examples 1-48.

What is claimed is:

1. A method for wireless communication, comprising:
receiving a semi-static configuration indicating a communication direction for each of a plurality of symbols in a slot as being uplink, downlink, or flexible, wherein the semi-static configuration indicates the communication direction for at least a first symbol of the plurality of symbols in the slot as being uplink, the communication direction for at least a second symbol of the plurality of symbols in the slot as being downlink, and the communication direction for at least a third symbol of the plurality of symbols in the slot as being flexible;
receiving a resource grant for transmitting over an uplink shared channel in at least two symbols of the plurality of symbols in the slot, wherein the resource grant indicates an index of a starting symbol for transmitting an uplink communication, a number of the at least two symbols for transmitting the uplink communication, and a nominal number of repetitions for transmitting the uplink communication, and wherein the resource grant includes a single bit indicator indicating that multiple symbols in the slot indicated by the semi-static configuration as flexible are not to be used for uplink communications; and
transmitting, based at least in part on the semi-static configuration and the single bit indicator, one or more repetitions of the uplink communication starting at the starting symbol, continuing over the number of the at least two symbols that do not include the multiple symbols indicated in the semi-static configuration as flexible, and based on the nominal number of repetitions.

2. The method of claim 1, wherein the semi-static configuration is received in radio resource control (RRC) signaling.

3. The method of claim 1, wherein the single bit indicator indicates that the multiple symbols indicated by the semi-static configuration as flexible are not to be used for uplink communications excluding a number of transition symbols used for at least one of transitioning from downlink to uplink or applying a timing advance.

4. The method of claim 3, further comprising receiving, in radio resource control (RRC) signaling, an indication of the number of transition symbols.

5. The method of claim 3, further comprising determining the number of transition symbols based on a downlink subcarrier spacing.

6. The method of claim 1, wherein the single bit indicator indicates that the multiple symbols indicated by the semi-static configuration as flexible are not to be used for uplink communications excluding a number of synchronization symbols indicated for reception of synchronization signal blocks.

7. The method of claim 1, wherein the single bit indicator indicates that the multiple symbols indicated by the semi-static configuration as flexible are not to be used for uplink communications excluding a number of control symbols indicated for reception of a control resource set.

8. The method of claim 1, wherein transmitting the one or more repetitions includes segmenting transmission over a number of transition symbols used for at least one of transitioning from downlink to uplink or applying a timing advance.

9. The method of claim 8, further comprising receiving, in radio resource control (RRC) signaling, an indication of the number of transition symbols.

10. The method of claim 8, further comprising determining the number of transition symbols based on a downlink subcarrier spacing.

11. The method of claim 1, wherein transmitting the one or more repetitions includes segmenting transmission over a number of synchronization symbols indicated for reception of synchronization signal blocks.

12. The method of claim 1, wherein transmitting the one or more repetitions includes segmenting transmission over a number of control symbols indicated for reception of a control resource set.

13. A method for wireless communication, comprising:
transmitting a semi-static configuration indicating a communication direction for each of a plurality of symbols in a slot as being uplink, downlink, or flexible, wherein the semi-static configuration indicates the communication direction for at least a first symbol of the plurality of symbols in the slot as being uplink, the communication direction for at least a second symbol of the plurality of symbols in the slot as being downlink, and the communication direction for at least a third symbol of the plurality of symbols in the slot as being flexible;
transmitting a resource grant for an uplink shared channel in at least two symbols of the plurality of symbols in the slot, wherein the resource grant indicates an index of a starting symbol for transmitting an uplink communication, a number of the at least two symbols for transmitting the uplink communication, a nominal number of repetitions for transmitting the uplink communication, and a single bit indicator indicating that multiple symbols in the slot indicated by the semi-static configuration as flexible are not to be used for uplink communications; and
receiving, based at least in part on the semi-static configuration and the single bit indicator, one or more repetitions of the uplink communication starting at the starting symbol, continuing over the number of the at least two symbols that do not include the multiple symbols indicated in the semi-static configuration as flexible, and based on the nominal number of repetitions.

14. The method of claim 13, wherein the semi-static configuration is transmitted in radio resource control (RRC) signaling.

15. The method of claim 13, wherein the single bit indicator indicates that the multiple symbols indicated by the semi-static configuration as flexible are not to be used for uplink communications excluding a number of transition symbols used for at least one of transitioning from downlink to uplink or applying a timing advance.

16. The method of claim 15, further comprising transmitting, in radio resource control (RRC) signaling, an indication of the number of transition symbols.

17. The method of claim 13, wherein the single bit indicator indicates that the multiple symbols indicated by the semi-static configuration as flexible are not to be used for uplink communications excluding at least one of a number of synchronization symbols indicated for reception of synchronization signal blocks that are indicated by the semi-static configuration as flexible, or a number of control symbols indicated for reception of a control resource set that are indicated by the semi-static configuration as flexible.

18. The method of claim 13, wherein receiving the one or more repetitions is based on skipping decoding over a number of transition symbols used for at least one of transitioning from downlink to uplink or applying a timing advance.

19. The method of claim 18, further comprising transmitting, in radio resource control (RRC) signaling, an indication of the number of transition symbols.

20. The method of claim 13, wherein receiving the one or more repetitions is based on skipping decoding over at least one of a number of synchronization symbols indicated for reception of synchronization signal blocks, or a number of control symbols indicated for reception of a control resource set.

21. An apparatus for wireless communication, comprising:
a transceiver;
a memory configured to store instructions; and
one or more processors communicatively coupled with the transceiver and the memory, wherein the one or more processors are configured to:
receive a semi-static configuration indicating a communication direction for each of a plurality of symbols in a slot as being uplink, downlink, or flexible, wherein the semi-static configuration indicates the communication direction for at least a first symbol of the plurality of symbols in the slot as being uplink, the communication direction for at least a second symbol of the plurality of symbols in the slot as being downlink, and the communication direction for at least a third symbol of the plurality of symbols in the slot as being flexible;
receive a resource grant for transmitting over an uplink shared channel in at least two symbols of the plurality of symbols in the slot, wherein the resource grant indicates an index of a starting symbol for transmitting an uplink communication, a number of the at least two symbols for transmitting the uplink communication, and a nominal number of repetitions for transmitting the uplink communication, and wherein the resource grant includes a single bit indicator indicating that multiple symbols in the slot indicated by the semi-static configuration as flexible are not to be used for uplink communications; and
transmit, based at least in part on the semi-static configuration and the single bit indicator, one or more repetitions of the uplink communication starting at the starting symbol, continuing over the number of the at least two symbols that do not include the multiple symbols indicated in the semi-static configuration as flexible, and based on the nominal number of repetitions.

22. The apparatus of claim 21, wherein the single bit indicator indicates that the multiple symbols indicated by the semi-static configuration as flexible are not to be used for uplink communications excluding at least one of a number of transition symbols used for at least one of transitioning from downlink to uplink or applying a timing advance, a number of synchronization symbols used to indicate reception of synchronization signal blocks, or a number of control symbols used to indicate reception of a control resource set.

23. The apparatus of claim 22, wherein the one or more processors are further configured to receive, in radio resource control (RRC) signaling, an indication of the number of transition symbols.

24. The apparatus of claim 22, wherein the one or more processors are further configured to determine the number of transition symbols based on a downlink subcarrier spacing.

25. The apparatus of claim 21, wherein the one or more processors are configured to transmit the one or more repetitions at least in part by segmenting transmission over at least one of a number of transition symbols used for at least one of transitioning from downlink to uplink or applying a timing advance, a number of synchronization symbols indicated for reception of synchronization signal blocks, or a number of control symbols indicated for reception of a control resource set.

26. The apparatus of claim 21, wherein the semi-static configuration is received in radio resource control (RRC) signaling.

27. The apparatus of claim 21, wherein the one or more processors are configured to transmit the one or more repetitions at least in part by segmenting transmission over a number of transition symbols used for at least one of transitioning from downlink to uplink or applying a timing advance.

28. The apparatus of claim 27, wherein the one or more processors are further configured to receive, in radio resource control (RRC) signaling, an indication of the number of transition symbols.

29. An apparatus for wireless communication, comprising:
 a transceiver;
 a memory configured to store instructions; and
 one or more processors communicatively coupled with the transceiver and the memory, wherein the one or more processors are configured to:
  transmit a semi-static configuration indicating a communication direction for each of a plurality of symbols in a slot as being uplink, downlink, or flexible, wherein the semi-static configuration indicates the communication direction for at least a first symbol of the plurality of symbols in the slot as being uplink, the communication direction for at least a second symbol of the plurality of symbols in the slot as being downlink, and the communication direction for at least a third symbol of the plurality of symbols in the slot as being flexible;
  transmit a resource grant for an uplink shared channel in at least two symbols of the plurality of symbols in the slot, wherein the resource grant indicates an index of a starting symbol for transmitting an uplink communication, a number of the at least two symbols for transmitting the uplink communication, a nominal number of repetitions for transmitting the uplink communication, and a single bit indicator indicating that multiple symbols in the slot indicated by the semi-static configuration as flexible are not to be used for uplink communications; and
  receive, based at least in part on the semi-static configuration and the single bit indicator, one or more repetitions of the uplink communication starting at the starting symbol, continuing over the number of the at least two symbols that do not include the multiple symbols indicated in the semi-static configuration as flexible, and based on the nominal number of repetitions.

30. The apparatus of claim 29, wherein the single bit indicator indicates that the multiple symbols indicated by the semi-static configuration as flexible are not to be used for uplink communications excluding at least one of a number of transition symbols used for at least one of transitioning from downlink to uplink or applying a timing advance, a number of synchronization symbols used to indicate reception of synchronization signal blocks, or a number of control symbols used to indicate reception of a control resource set.

* * * * *